(12) United States Patent
Venugopal et al.

(10) Patent No.: US 12,457,342 B2
(45) Date of Patent: Oct. 28, 2025

(54) PREDICTIVE CODING CONCEPT USING TEMPLATE MATCHING

(71) Applicant: Fraunhofer-Gesellschaft zur Foerderung der angewandten Forschung e.V., Munich (DE)

(72) Inventors: Gayathri Venugopal, Berlin (DE); Detlev Marpe, Berlin (DE); Thomas Wiegand, Berlin (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 1050 days.

(21) Appl. No.: 16/534,915

(22) Filed: Aug. 7, 2019

(65) Prior Publication Data

US 2019/0364283 A1 Nov. 28, 2019

Related U.S. Application Data

(63) Continuation of application No. PCT/EP2018/053078, filed on Feb. 7, 2018.

(30) Foreign Application Priority Data

Feb. 8, 2017 (EP) .................................. 17155293

(51) Int. Cl.
*H04N 19/146* (2014.01)
*H04N 19/119* (2014.01)
*H04N 19/122* (2014.01)
*H04N 19/176* (2014.01)

(52) U.S. Cl.
CPC ......... *H04N 19/146* (2014.11); *H04N 19/119* (2014.11); *H04N 19/122* (2014.11); *H04N 19/176* (2014.11)

(58) Field of Classification Search
CPC ..................................................... H04N 19/146
USPC ..................................................... 375/240.24
See application file for complete search history.

(56) References Cited

U.S. PATENT DOCUMENTS

| | | | |
|---|---|---|---|
| 2004/0071352 A1 | 4/2004 | Mizoguchi et al. | |
| 2008/0002878 A1* | 1/2008 | Meiyappan | G06T 7/32 382/294 |
| 2010/0246675 A1 | 9/2010 | Gharavi-Alkhansari et al. | |
| 2012/0320209 A1* | 12/2012 | Vico | G06T 7/80 348/148 |

(Continued)

FOREIGN PATENT DOCUMENTS

| | | |
|---|---|---|
| AU | 2013202014 A1 | 4/2013 |
| CN | 101715135 A | 5/2010 |

(Continued)

OTHER PUBLICATIONS

Tan, Thiow K, et al., "Intra Prediction by Averaged Template Matching Predictors", Consumer Communications and Networking Conference, 2007, CCNC 2007. 20 07 4th IEEE, IEEE, PI, Jan. 1, 2007, XP031087817, Jan. 2007, pp. 405-409.

(Continued)

*Primary Examiner* — Yulin Sun
(74) *Attorney, Agent, or Firm* — Perkins Coie LLP; Michael A. Glenn

(57) ABSTRACT

Concepts for predictive picture coding using template matching are presented which may, for a given computation complexity, result in an increased coding efficiency.

35 Claims, 15 Drawing Sheets

(56) References Cited

U.S. PATENT DOCUMENTS

| | | | | |
|---|---|---|---|---|
| 2012/0320983 A1* | 12/2012 | Zheng | ............... | H04N 19/573 |
| | | | | 375/E7.243 |
| 2014/0314330 A1* | 10/2014 | Cherigui | ............ | H04N 19/105 |
| | | | | 382/238 |
| 2015/0271517 A1* | 9/2015 | Pang | ................ | H04N 19/52 |
| | | | | 375/240.16 |
| 2016/0105682 A1* | 4/2016 | Rapaka | ............ | H04N 19/50 |
| | | | | 375/240.12 |
| 2017/0099438 A1* | 4/2017 | Sakaida | ............ | H04N 5/23254 |

FOREIGN PATENT DOCUMENTS

| | | |
|---|---|---|
| CN | 101854545 A | 10/2010 |
| CN | 102804774 A | 11/2012 |
| CN | 102970529 A | 3/2013 |
| CN | 103391430 A | 11/2013 |
| CN | 104065970 A | 9/2014 |
| EP | 2023639 A1 | 2/2009 |
| EP | 2782344 A1 | 9/2014 |
| JP | 2007336277 A | 12/2007 |

OTHER PUBLICATIONS

Bossen, Frank, "Common Test Conditions and Software Reference Configurations", JCTVC-L1100 of JCT-VC, Geneva, CH, Jan. 2013, 12 pp.

Cherigui, Safa et al., "Hybrid template and block matching algorithm for image intra prediction", IEEE International Conference on Acoustics, Speech and Signal Processing (ICASSP), Kyoto, Mar. 2012, pp. 781-784.

Guionnet, T. et al., "Non-CE6: Intra prediction based on weighted template matching predictors (WTM)", 7. JCT-VC Meeting; 98. MPEG Meeting; Nov. 21, 2011 to Nov. 30, 2011; Geneva; (Joint Collaborative Team on Coding of ISO/IEC JTC1/SC29/WG11 and ITU-T SG.16); URL: http://wftp3.itu.int/av-arch/jctvc-site/, No. JCTVC-G598, XP030110582, Nov. 9, 2011, 8 pp.

Guo, Yi et al., "Priority-based template matching intra prediction", IEEE International Conference on Multimedia and Expo 2008, Hannover, Germany, Jun. 2008, pp. 1117-1120.

Moinard, Matthieu et al., "A set of template matching predictors for intra video coding", IEEE International Conference on Acoustics, Speech and Signal Processing (ICASSP) 2010, Mar. 2010, 4 pp.

Sze, Vivienne et al., "High Efficiency Video Coding (HEVC) Algorithms and Architectures", Springer, 2014, 384 pp.

Tan, Thiow K. et al., "Intra prediction by averaged template matching predictors", Proc. CCNC 2007, Las Vegas, NV, USA, 2007, pp. 405-109.

Tan, Thiow K. et al., "Intra prediction by template matching", ICIP 2006, Atlanta, GA, 2006, pp. 1693-1696.

Zhang, Tao et al., "Hybrid angular intra/template matching prediction for HEVC intra coding", Visual Communications and Image Processing 2015, Singapore, Dec. 2015, pp. 1-4.

Zheng, Yunfei et al., "Intra prediction using template matching with adaptive illumination compensation", Proc. IEEE International Conference on Image Processing ICIP2008, San Diego, CA, Oct. 2008, 4 pp.

Abou-Elailah, Abdalbassir, et al., "Successive Refinement of Side Information using Adaptive Search Area for Long Duration GOPs in Distributed Video Coding", 19th International Conference on Telecommunications, 6 pp.

Xiao-Peng, Xia, "[Uploaded in 12 parts] Research on Key Technologies of H.264/HEVC Video Coding & Decoding Standard", A Thesis Submitted to University of Chinese Academy of Sciences, Institute of Optics and Electronics, Chinese Academy of Sciences, 14 pp.

* cited by examiner

PREDICTIVE CODING CONCEPT USING TEMPLATE MATCHING

CROSS-REFERENCE TO RELATED APPLICATIONS

This application is a continuation of copending International Application No. PCT/EP2018/053078, filed Feb. 6, 2018, which is incorporated herein by reference in its entirety, and additionally claims priority from European Application No. EP 17155293.8, Feb. 8, 2017, which is also incorporated herein by reference in its entirety.

The present application is concerned with a predictive coding concept using template matching which would, for instance, be applicable to hybrid video codex such as HEVC or H.264, for instance.

BACKGROUND OF THE INVENTION

In a block based video coding standard, like H.265/High Efficiency Video Coding (HEVC) or H.264/Advanced Video Coding (AVC), a picture is partitioned into blocks. Each block is then predicted by using either intra or inter prediction. While the former prediction method uses only decoded samples within the same picture as a reference, the latter uses displaced blocks of already decoded pictures [1]. Once the predicted blocks are obtained, they are used to calculate residual blocks which are further processed before encoding. Information related to the tools and techniques applied at the encoder are to be sent to the decoder for reconstruction of the images.

Intra prediction is dealt with the utmost importance in all the video coding standards. The H.264/AVC has 9 intra modes and for the latest H.265/HEVC there are 35 modes. The encoder decides the best intra mode which minimizes the cost function and that mode is signaled in the bitstream to the decoder. The cost function J is defined as:

$$J = D + \lambda R, \quad (1)$$

where D is the distortion between the original and predicted blocks, R is the number of bits associated with the intra mode and $\lambda$ is the Lagrange parameter that determines the trade-off between D and R [1].

H.265/HEVC angular prediction provides high-fidelity predictors for objects with directional structures. The additional Planar and DC prediction modes can effectively model smooth image areas [1]. HEVC has also some advanced processing techniques for improving intra prediction, like filtering of reference samples before actual prediction and post-processing of the predicted samples. There is, however, an ongoing wish to further improve coding efficiency.

Naturally, it would be also be favorable to have a concept at hand which increases the coding efficiency of inter picture prediction where the transmission of the motion information, i.e., the motion field, consumes a considerable amount of the available data rate.

Template matching (TM) is a texture synthesis technique used in digital image processing. This can be applied for intra prediction as well. The known pixels present above and left of the current block is called the template. The method may find the best match for the template in the reconstructed frame by minimizing the sum of squared differences (SSD). Finally, the TM block is copied to the current block which becomes the prediction. The TM intra mode may not need any side information for reconstruction at the decoder. On the other hand, the search algorithm for the template match has to be repeated. This leads to high decoder complexity.

Intra prediction by TM was first proposed in [2] for H.264/AVC. In [3] from the same authors, TM with more than one predictor was proposed. Some other proposals related to TM intra prediction can be found in the literature [4, 5, 6, 7, 8]. All the works mentioned above concentrates more on the coding gain from TM without considering much about the complexity increase.

SUMMARY

An embodiment may have an apparatus for picture decoding, configured to select, out of a search area of a picture, a set of one or more patches which match a template area adjacent to a predetermined picture block; and predictively decode the predetermined picture block from a data stream based on the set of one or more patches, wherein the apparatus is configured to select the search area out of a plurality of subareas into which an overall search area associated with the predetermined picture block is sub-divided, based on a signalization in the data stream.

According to another embodiment, a method for picture decoding may have the steps of: selecting, out of a search area of a picture, a set of one or more patches which match a template area adjacent to a predetermined picture block; and predictively decoding the predetermined picture block from a data stream based on the set of one or more patches, and selecting the search area out of a plurality of subareas into which an overall search area associated with the predetermined picture block is sub-divided, based on a signalization in the data stream.

Another embodiment may have an apparatus for picture coding configured to select, out of a search area of a picture, a set of one or more patches which match a template area adjacent to a predetermined picture block; and predictively encode the predetermined picture block into a data stream based on the set of one or more patches, wherein the search area is spatially subdivided into a plurality of subareas and the apparatus is configured to signal within the data stream which subarea the set of one or more patches are located in.

According to another embodiment, a method for picture coding may have the steps of: selecting, out of a search area of a picture, a set of one or more patches which match a template area adjacent to a predetermined picture block; and predictively encoding the predetermined picture block into a data stream based on the set of one or more patches, wherein the search area is spatially subdivided into a plurality of subareas and the method comprises signalling within the data stream which subarea the set of one or more patches are located in.

Another embodiment may have an apparatus for picture decoding, configured to select, out of a search area of a picture, a set of one or more patches which match a template area adjacent to a predetermined picture block; and predictively decode the predetermined picture block from a data stream based on the set of one or more patches, wherein the apparatus is configured to set a size of the search area depending on side information in the data stream.

According to another embodiment, a method for picture decoding may have the steps of: selecting, out of a search area of a picture, a set of one or more patches which match a template area adjacent to a predetermined picture block; and predictively decoding the predetermined picture block from a data stream based on the set of one or more patches, and setting a size of the search area depending on side information in the data stream.

Another embodiment may have an apparatus for picture coding configured to select, out of a search area of a picture, a set of one or more patches which match a template area adjacent to a predetermined picture block; and predictively encode the predetermined picture block into a data stream based on the set of one or more patches, wherein the apparatus is configured to set a size of the search area depending on side information in the data stream.

According to another embodiment, a method for picture coding may have the steps of: selecting, out of a search area of a picture, a set of one or more patches which match a template area adjacent to a predetermined picture block; and predictively encoding the predetermined picture block into a data stream based on the set of one or more patches, and setting a size of the search area depending on side information in the data stream.

Another embodiment may have a non-transitory digital storage medium having a computer program stored thereon to perform any of the inventive methods when said computer program is run by a computer.

Another embodiment may have a data stream generated by a method for picture coding, the method having the steps of: selecting, out of a search area of a picture, a set of one or more patches which match a template area adjacent to a predetermined picture block; and predictively encoding the predetermined picture block into a data stream based on the set of one or more patches, wherein the search area is spatially subdivided into a plurality of subareas and the method comprises signalling within the data stream which subarea the set of one or more patches are located in.

Another embodiment may have a data stream generated by a method for picture coding, the method having the steps of: selecting, out of a search area of a picture, a set of one or more patches which match a template area adjacent to a predetermined picture block; and predictively encoding the predetermined picture block into a data stream based on the set of one or more patches, and setting a size of the search area depending on side information in the data stream.

In accordance with a first aspect of the present application, template matching is used for predictive picture coding and the predictive picture coding is made more efficient in terms of computational complexity by sub-dividing the search area within which template matching is performed at the encoder side, into subareas and signaling this subarea within which the selected set of one or more patches are located, in the data stream to the decoder. The decoder in turn, performs template matching using the subarea signaled in the data stream as the search area. Thereby, a good trade-off may be achieved between keeping the signalization overhead low on the one hand and avoiding a too-high computational complexity at the decoder side on the other hand. In other words, the decoder may restrict the computational efforts associated with template matching to the signaled subarea.

In accordance with an embodiment, patch averaging is used as a basis for the predictive coding of the predetermined block, i.e. averaging of more than one patch within the signaled subarea is performed, such as averaging over the p>1 best matches. The inventors of the present application found out that, in the case of using patch averaging, the prediction preciseness-loss that comes along with restricting the patches participating in the averaging to the subarea signaled in the data stream, is negligible compared to the advantage of being able to keep the computational complexity at the decoder side low by restricting the template matching process at the decoder side to the signal subarea only.

In accordance with a further aspect of the present application, template-matching-based predictive picture coding is made more efficient when taking rate/distortion coding efficiency into account along with the computational complexity involved therewith, by setting a size of the search area within which template matching is performed, depending on side information in the data stream. For instance, the side information comprises one or more of the group consisting of a picture size parameter indicating a picture size, a tile-subdivision information, indicating a number of independently coded picture tiles, and a picture-content class identifier, distinguishing, for instance, panoramic pictures from non-panoramic pictures. Setting the search area in this manner results in an efficient comprise between computational complexity on the one hand and coding gain using the template matching-based predictive coding on the other hand.

BRIEF DESCRIPTION OF THE DRAWINGS

Embodiments of the present invention will be detailed subsequently referring to the appended drawings, in which.

DETAILED DESCRIPTION OF THE INVENTION

The following description of embodiments of the present application starts with a specific embodiment relating to intra picture prediction. In this embodiment, several aspects of the present application are involved. Later on, further embodiments of the present application are described which selectively adopt certain characteristics and features of this initially described embodiment. Insofar, it should be noted that, firstly, the initially described embodiment should not be treated as limiting the embodiments described later on. On the other hand, the features described with respect to the initially described embodiment may individually, in groups or all together, be transferred onto the embodiments described later on in order to result in even alternative embodiments so that the description brought forward with respect to the initially described embodiment should also be treated as a reservoir for explaining possible implementation details with respect to the embodiments described later on.

In accordance with the embodiment described next, the idea of TM is extended for intra picture prediction. This extension might be used, for instance, as a new intra prediction mode in a picture or video codec such as HEVC, H.264 or some other block-based predictive picture/video codec. Later on it will be noted that this extension might be transferred onto inter picture prediction as well.

As mentioned previously, typical TM intra mode results in high decoder complexity even though no side information is being send. This might be unfair towards the decoder. The embodiment described below targets to reduce the complexity despite compromising little on coding efficiency. For the time being, the research was narrowed down to HEVC intra prediction and initial investigation was conducted on different parameters of TM intra mode, like the template size, multiple predictors. Based on this, 2 pixel wide rotated-L shaped template and three predictors were decided upon for the mode further described now.

Figure 1:
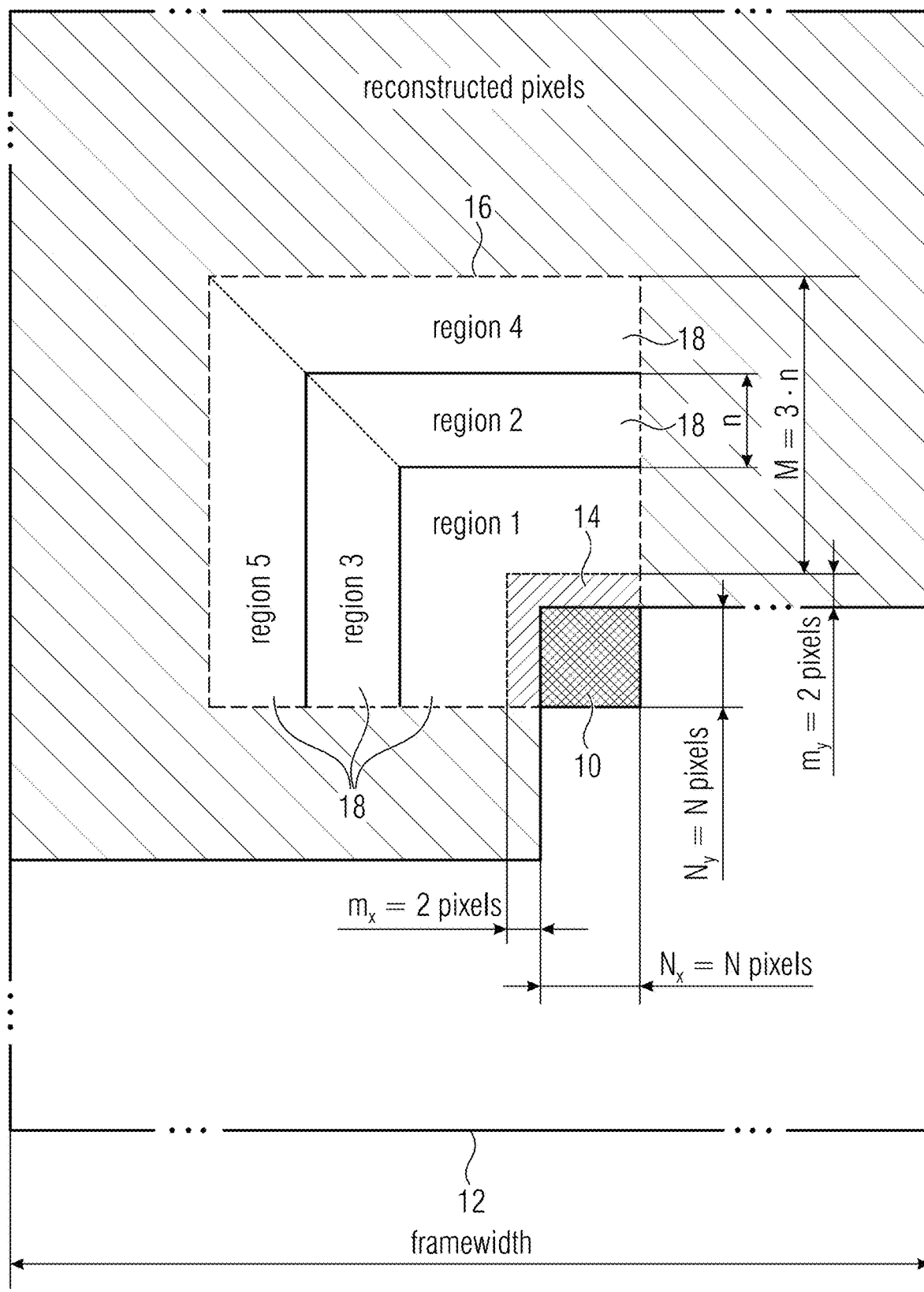
FIG. 1 shows a schematic diagram illustrating template matching intra prediction.

The mode discussed herein operates as follows: consider an N×N block 10 to be predicted. As shown in FIG. 1, in the reconstructed frame 12, (N+2)×2 pixels above and 2×N pixels left of the block 10 are taken as the template 14. Rather than searching the entire frame 12 for the best match, one searches inside a window 16. Based on the frame size of the video sequence, the window size is decided. This window 16 is further divided into five regions 18 (FIGS. 2 and 3) illustratively with respect to one region 18, namely region no. 4, the three best template matches 20 from each region 18 are found by minimizing SSD. The average 22 of the respective TM blocks 24 becomes the prediction 26 of the current block 10. Advantage of the rate-distortion optimization algorithm of the HEVC encoder according to (1) might be taken to decide which region 18 gives the best prediction. The information related to the chosen region is signaled in the bitstream. The decoder searches for the best matches only in that signaled region and uses the average of the TM blocks for the final prediction. The aforementioned intra mode may be added to the encoder candidate list of luma samples for all available intra block sizes along with its 35 other intra modes.

The HEVC test model reference software (HM version 16.6) and the common test conditions [9] have been used for experiments. All tests were restricted to All Intra (AI) main configuration.

Figure 4:
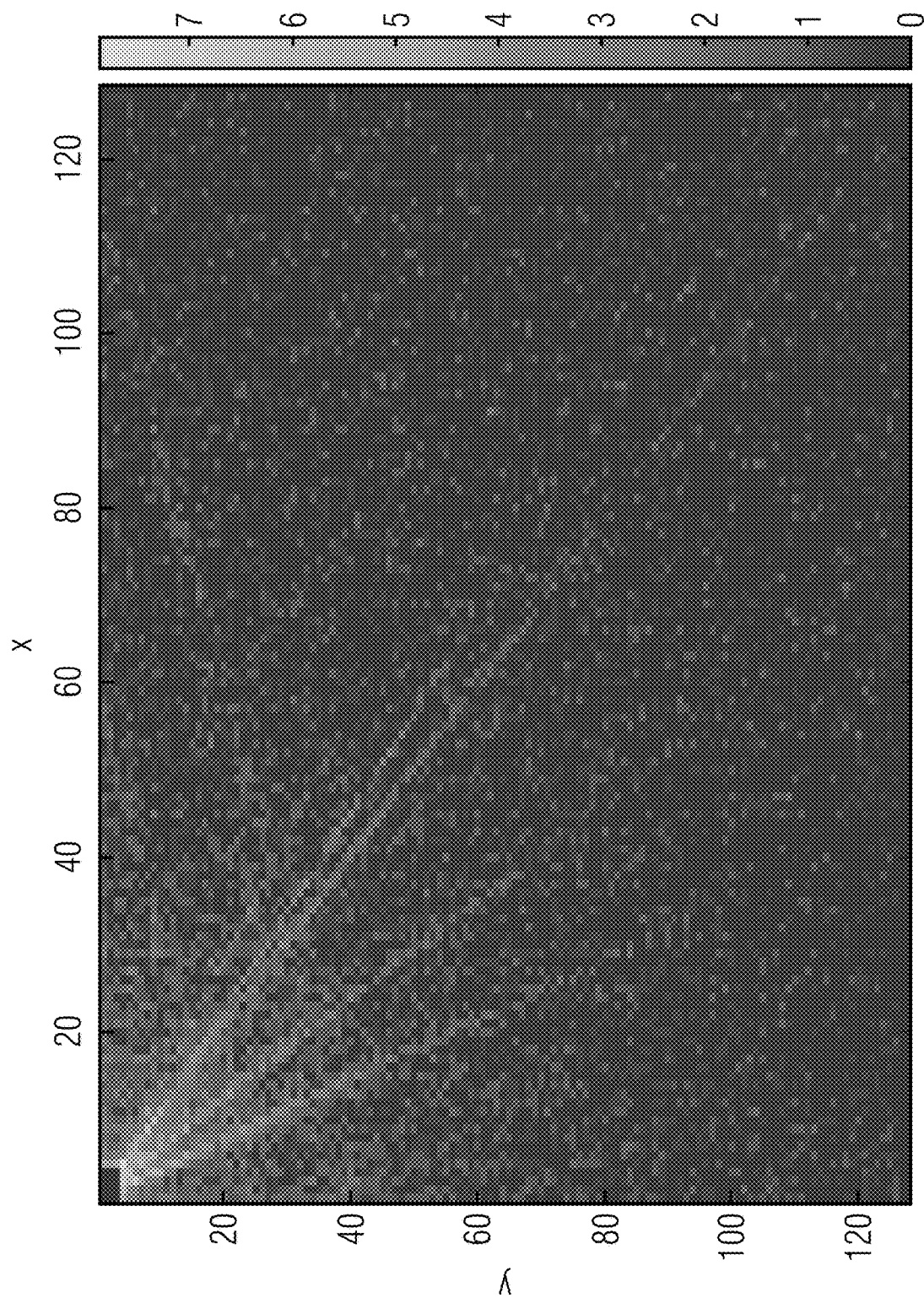
FIG. 4 shows a histogram of the number of TM blocks (in logarithm gray scale) with respect to the current block inside a 128×128 window for BasketBallDrill of QP=22.

FIG. 4 shows a grayscale histogram of the number of TM blocks with respect to the current block inside a 128×128 window for BasketBallDrill of QP=22. In order to reduce the complexity of the search algorithm the position of TM blocks 20 with respect to the current block 10 has been investigated. The study indicates that the TM block is more often present in the neighborhood of the current block as shown in FIG. 4. This clearly justifies the use of a window 16 for searching in the mode presented here.

Figure 5:
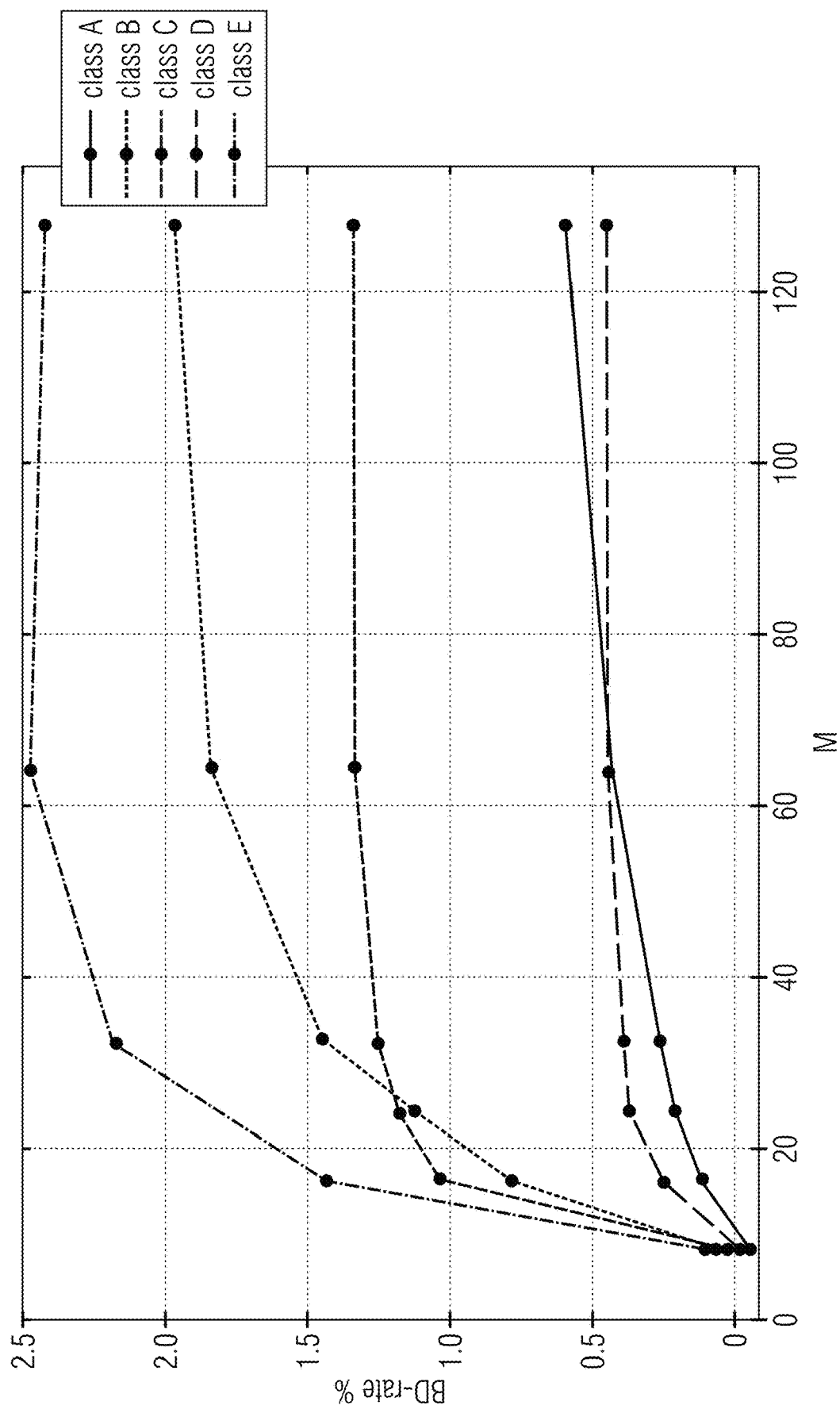
FIG. 5 shows BD-rate results for different values of M.
Figure 6:
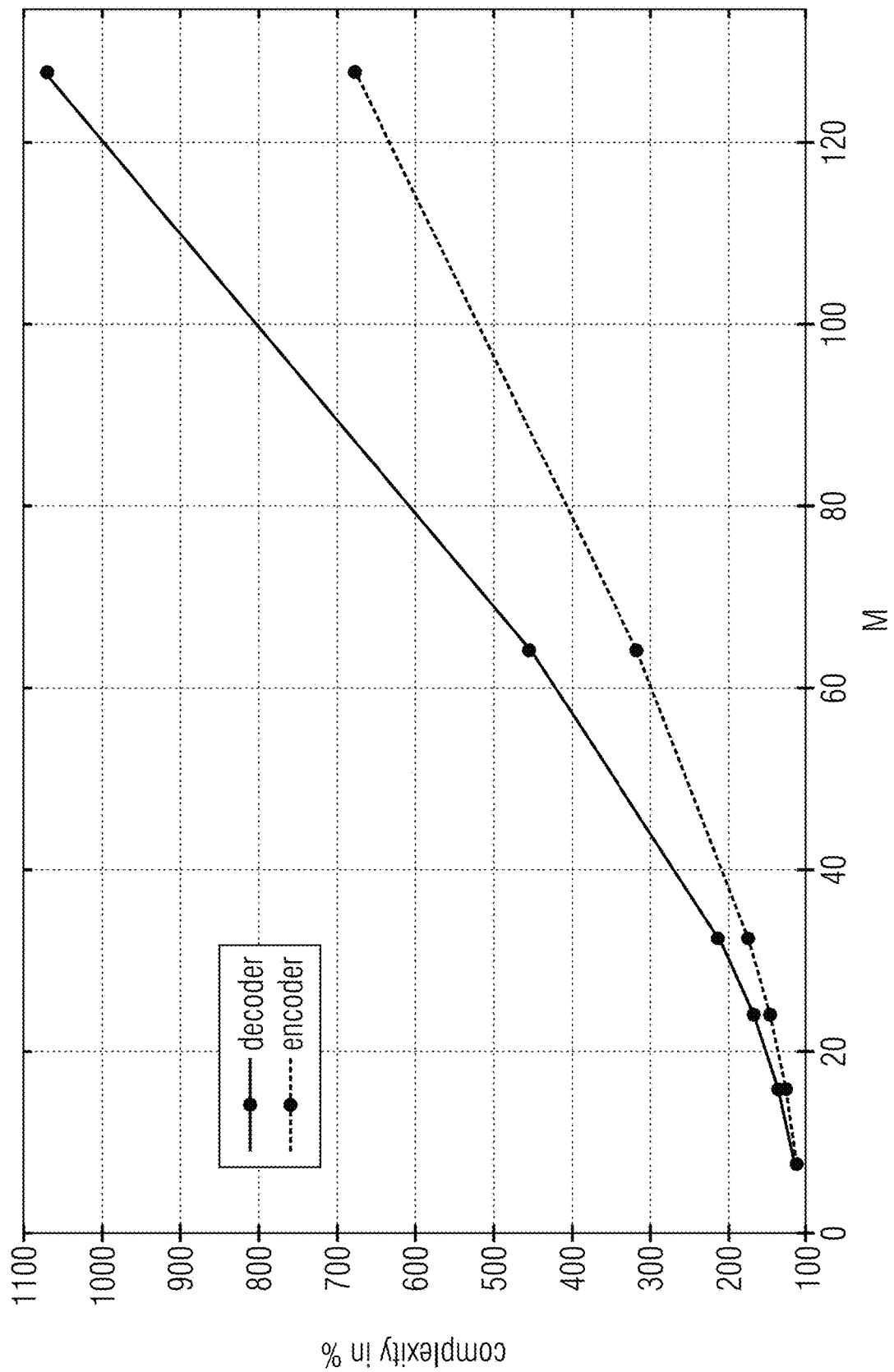
FIG. 6 shows complexity results for different values of M.

As to search window size, an investigation into the effect of the search window size has been carried out. Window sizes M=8, 16, 24, 32, 64, 128 were considered for this. The general tendency from the research result is that the bigger the window 16, the better the performance as shown in FIG. 5. However, there are three main observations to be noted here. First, the gain saturates after a particular value of M and second, this value of M varies with different classes. Third, large window points to high complexity as shown in FIG. 6. These remarks led to the idea of an adaptive window for searching where the window size varies with frame characteristics such as the frame size of the sequence.

Figure 7:
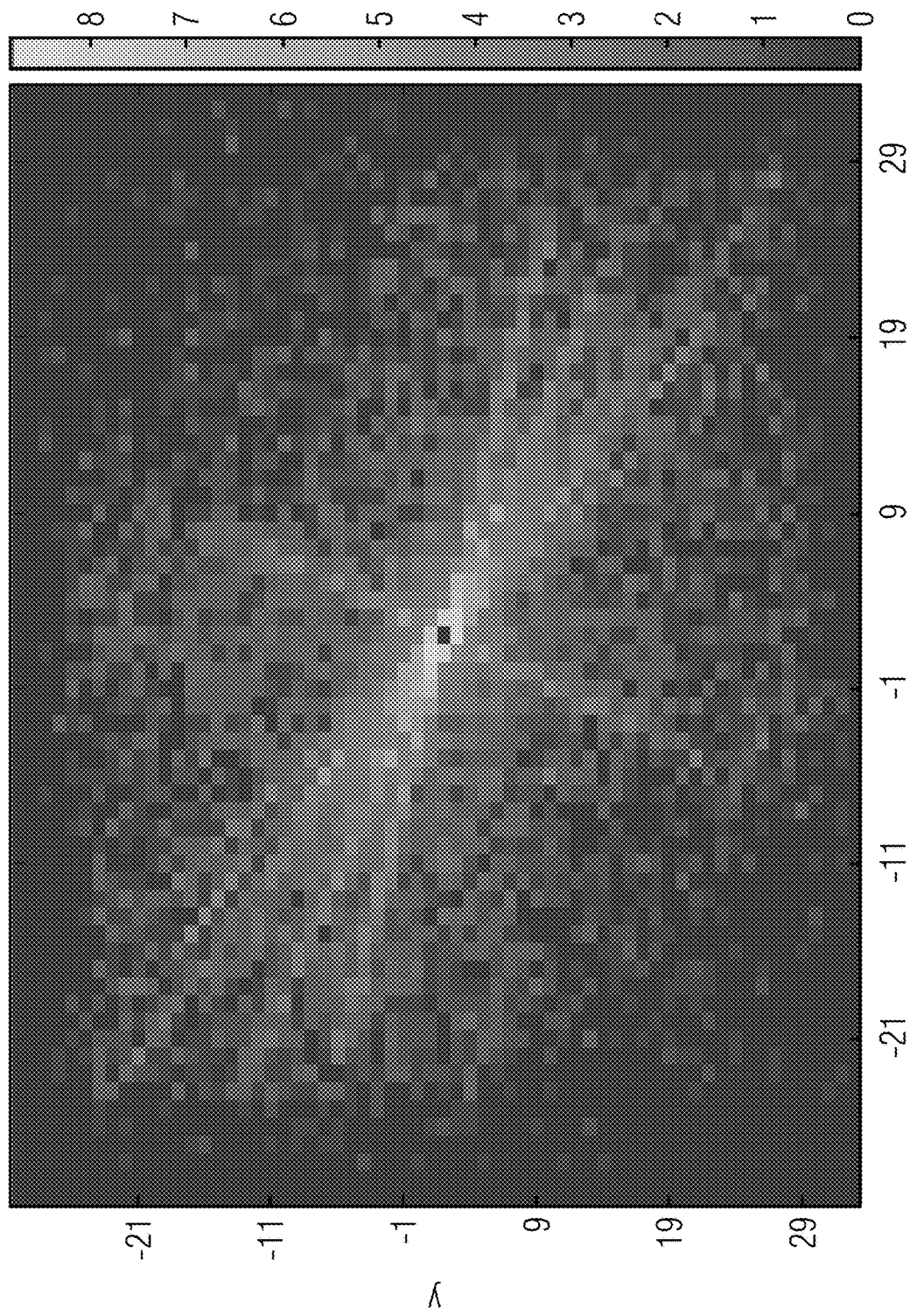
FIG. 7 shows a histogram of the number of second best TM blocks (log) with respect to the first block, for BasketBallDrill with QP=22 for 10 frames.

Further an investigation on the position of second best TM block with respect to first has been performed. In the TM mode introduced with respect to FIGS. 1 to 3, the average of three best TM blocks issued for prediction. For reducing complexity, it was important to understand the position of the second and third best TM blocks with respect to the first one. One wanted to know if the three blocks are spread out or near. The research results show that they are more often close to one another as shown in FIG. 7. FIG. 7 shows a histogram of the number of second best TM blocks (log) with respect to the first block, for BasketBallDrill with QP=22 for 10 frames. This observation guided to the division of search window 16 into different regions 18. Based on the experimental results, an adaptive search window 16 has been assessed where its size is varied depending on the frame size. The window size is M×M where M=n×3 (see FIG. 2) and n is calculated as, if N≥16, n=2×A else:

$$n = \begin{cases} A & \text{if } 0 \le \text{framewidth} \le 832, \\ 2 \times A & \text{if } 832 < \text{framewidth} < 1280, \\ 3 \times A & \text{if } 1280 \le \text{framewidth} < 2560, \\ 4 \times A & \text{otherwise.} \end{cases} \quad (2)$$

where $A = 4$

It should be noted here that the proposed adaptive search window 16 is applied only to smaller blocks. The value of A is chosen in such a way that it is a good trade-off between coding efficiency and complexity.

Figure 8:
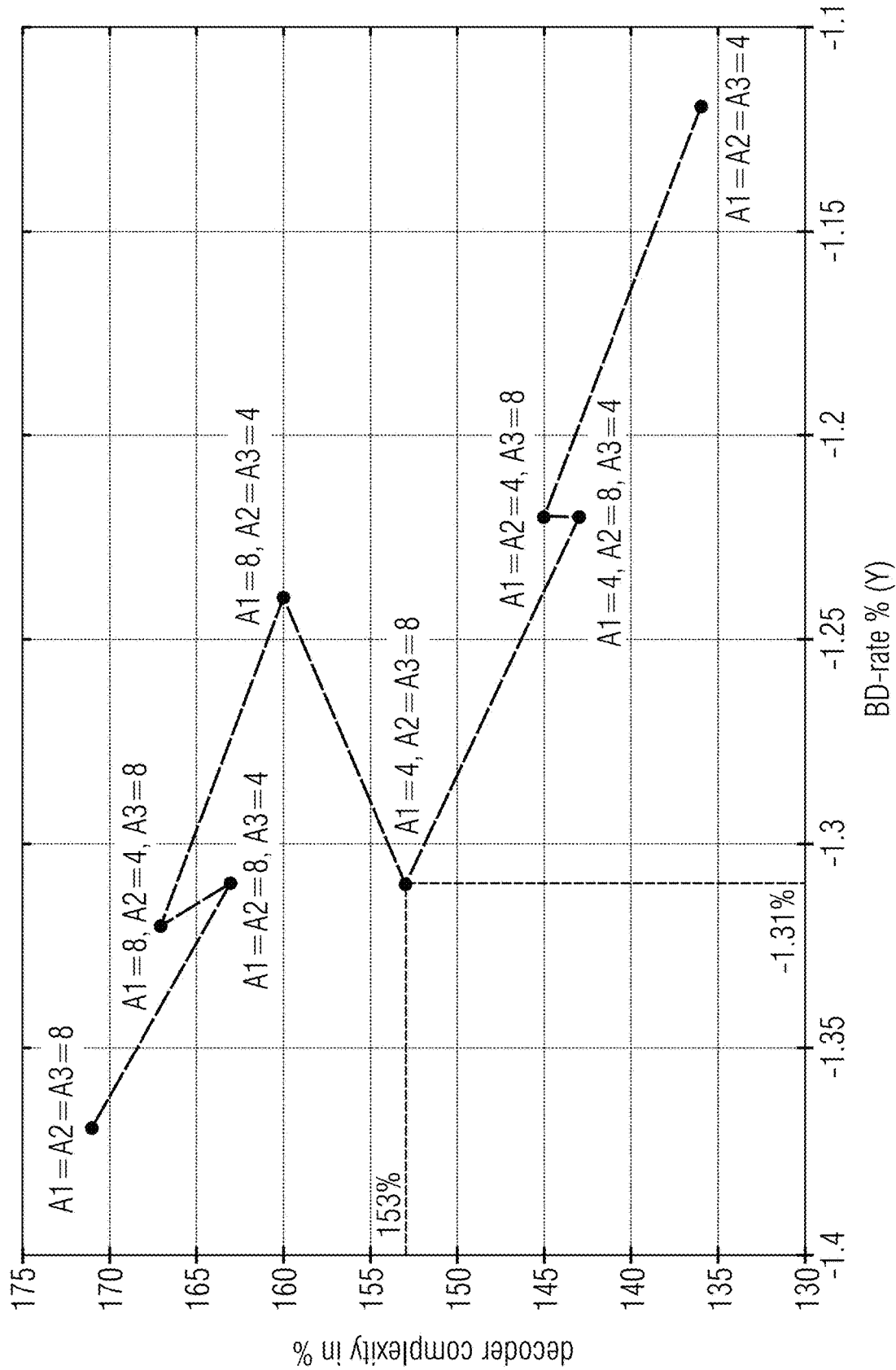
FIG. 8 shows BD-rate Vs Decoder complexity for different combinations of A1, A2, A3.

The new TM intra mode will work well for HEVC when there is a good trade-off between performance and complexity. Therefore, the value of A should be chosen carefully. One considers the value of A for Region1 to be A1, for Region2 and 3 to be A2 and, for the rest as A3. Similarly, n1 is related to A1, n2 to A2 and n3 to A3. We carried out tests for different combinations of A1, A2 and A3 with A=4 as the lower bound and A=8 as the upper bound. The search window is adapted according to the formula (2). Our experimental results indicate that further coding efficiency can be achieved by unequal values of A as shown in FIG. 8.

The mode discussed above can achieve an average BD-rate gain of −1.15% for classes A to E with 133% decoder complexity (Table.1).

TABLE 1

Results of the proposed intra mode for HEVC

| | Test Sequences | BD Rate gain (Y) |
|---|---|---|
| Class A | Traffic | −0.49% |
| | PeopleOnStreet | −0.84% |
| | Nebuta Festival | −0.10% |
| | SteamLocomotive | −0.16% |
| Class B | Kimono | −0.63% |
| | ParkScene | −0.45% |
| | Cactus | −2.36% |
| | BQTerrace | −2.43% |
| | BasketBallDrive | −2.15% |
| Class C | RaceHorses | −0.12% |
| | BQMall | −0.72% |
| | PartyScene | −0.54% |
| | BasketBallDrill | −3.23% |
| Class D | RaceHorses416x240 | 0.01% |
| | BQSquare | −0.80% |
| | BlowingBubbles | −0.18% |
| | BasketBallPass | −0.30% |
| Class E | FourPeople | −1.28% |
| | Johnny | −4.60% |
| | KristenAndSara | −1.64% |
| | Average | −1.15% |
| | Decoder Complexity | 133% |
| | Encoder Complexity | 180% |

Figure 9:
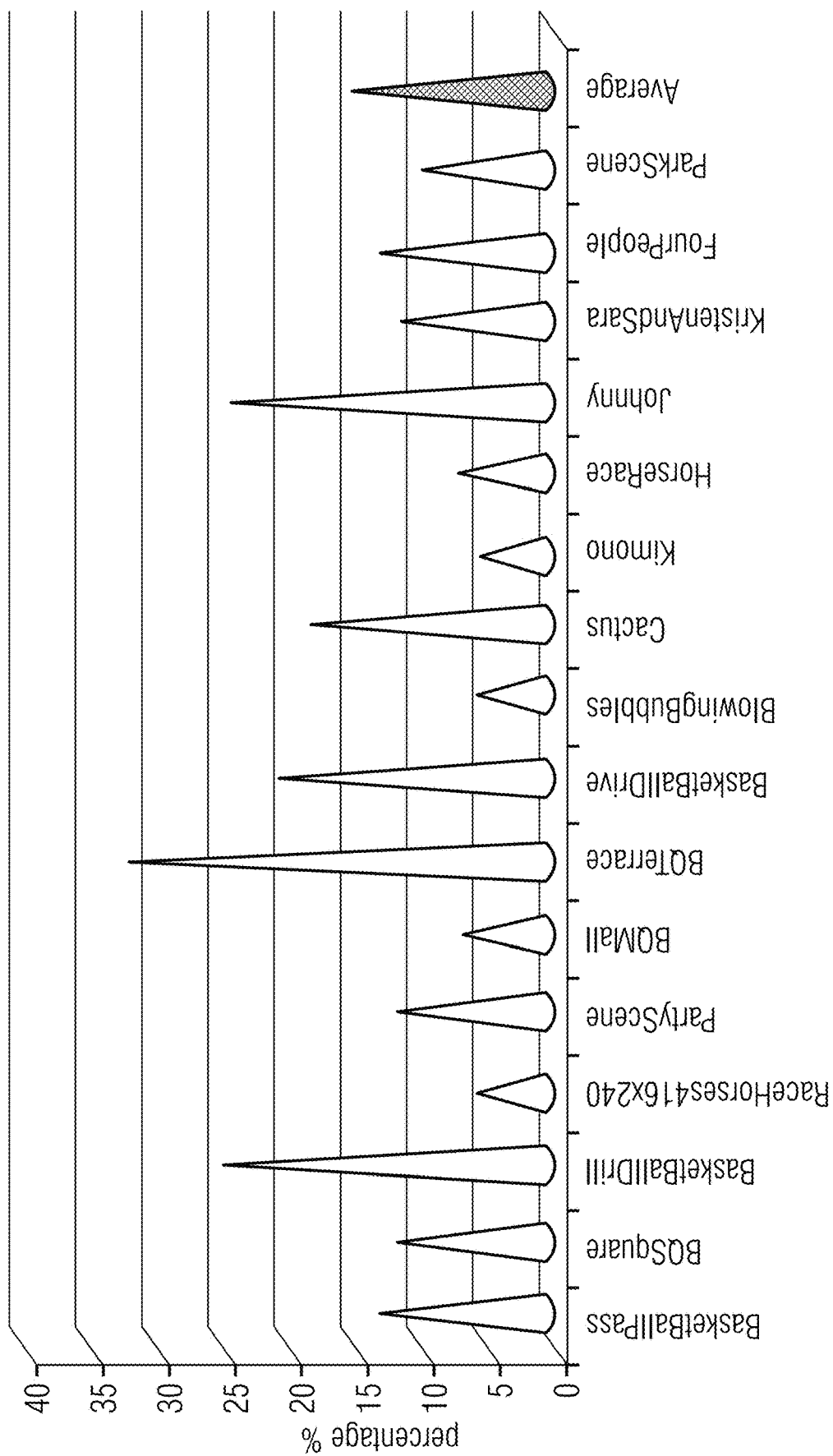
FIG. 9 shows average percentage of area in a frame predicted by TM mode for different sequences.

It can be seen that the proposed mode can achieve gain as high as −4.60% (for Johnny). According to the tests, an average area of 14.4% of a frame is predicted by TM mode as shown in FIG. 9. The experimental results indicates that TM mode works best for sequences with homogeneous structures.

In the following, embodiments for encoder and decoder are described. These embodiments use certain aspects of the above-presented TM mode and, accordingly, represent a kind of broadening of the specific mode presented above and having formed the basis of the experiments discussed above. In order to ease the understanding as to how the embodiments described below are related to the embodiments described above, the same reference signs are used and the figures relating to the subsequent embodiments.

Figure 10:
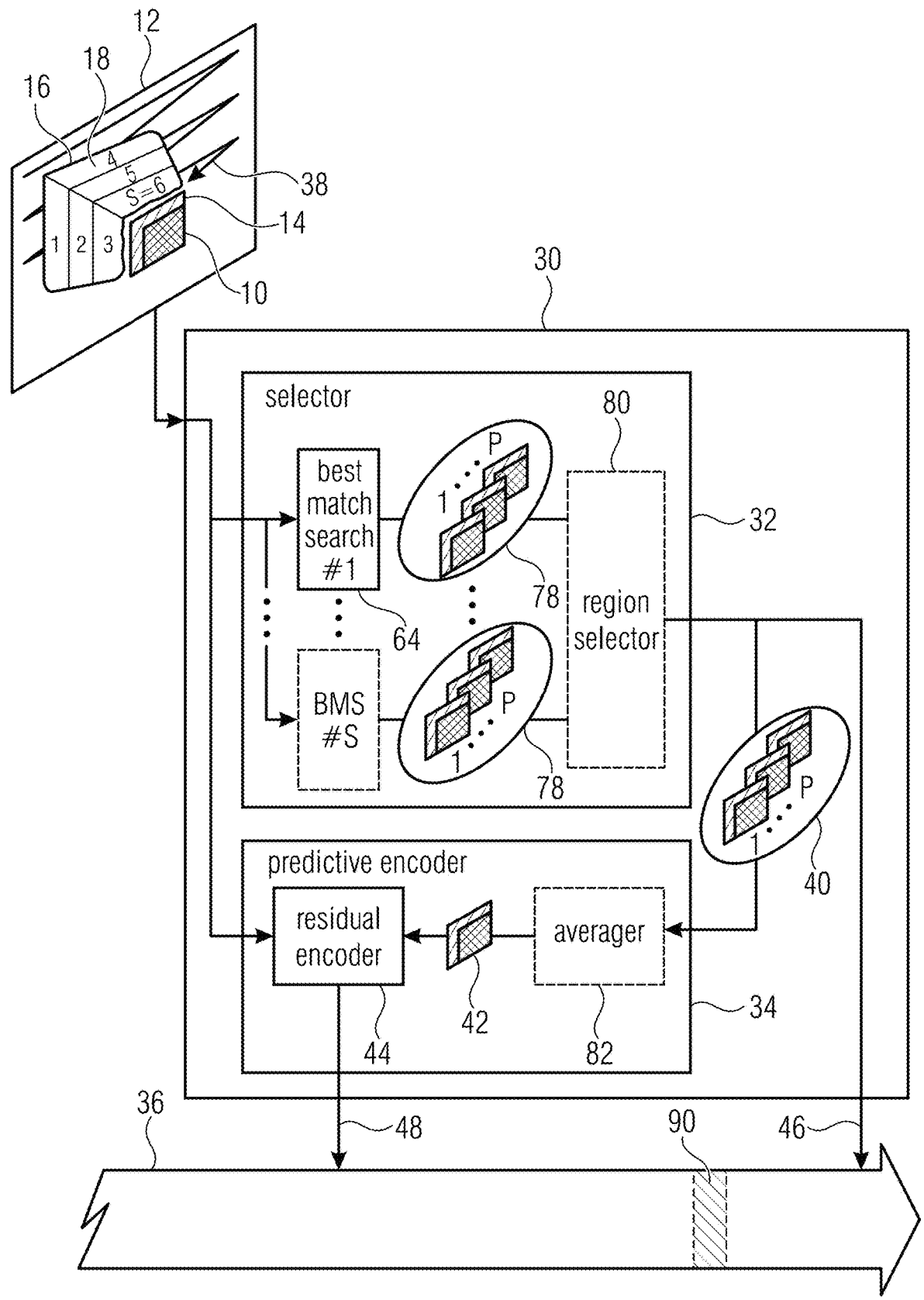
FIG. 10 shows a block diagram of an encoder according to an embodiment of the present application using a search area subdivided into regions and signaling of a selected region to decoder side.

FIG. 10 shows an encoder or an apparatus for picture coding, respectively. The apparatus is generally indicated using reference sign 30 and comprises, internally, a selector 32 and a predictive encoder 34. FIG. 10 also shows an optional internal configuration of selector 32 and predictive encoder 34. These details are described further below.

Generally speaking, apparatus 30 is for coding picture 12 into a data stream or bitstream 36. Apparatus 30 is a block-based coder which codes picture 12 into data stream 36 in units of these blocks. Block 10 is such a block. It should be noted that although block 10 is illustrated as being quadratic in FIG. 10 as well as in the preceding figures, the embodiments of the present application are not restricted to such kinds of blocks. Block 10 may be rectangular or of any other shape. According to the block-based nature of the operation of encoder 30, encoder 30 may encode each block of picture 12 into a data stream 36 in a manner described herein, or may choose, for each block, one of several coding modes among which one corresponds to the coding concept described with respect to FIG. 10. The one or more other coding modes which encoder 30 might support may include other intra picture prediction and/or inter picture prediction modes. A coding order 38 may be defined among the blocks into which picture 12 is subdivided with this coding order traversing, for instance, picture 12 in a row-wise raster scan order from the top of picture 12 to the bottom of picture 12 as illustrated in FIG. 10. "Generally leading in a row-wise raster scan order from top to bottom" shall also include any hierarchical ordering. For instance, the blocks to which block 10 belongs, may be leaf blocks of a multi-tree subdivision of tree wood blocks into which picture 12 is subdivided regularly in rows and columns of such tree wood blocks. The order 38 may traverse the tree wood blocks row-wise from top to bottom wherein, within each tree wood block, the order traverses the leaf blocks of the respective tree wood block in accordance with some predetermined order such as a depth-first traversal order before proceeding to the next tree wood block. Encoder 30 may not have to encode picture 12 sequentially using order 38, but blocks preceding in accordance with order 38 could be regarded as being available at the decoder side and thus, as being available for prediction purposes with respect to a current block such as block 10 while blocks succeeding in accordance with order 38 could be regarded as being unavailable at the decoder side. In other words, portions of picture 12 composed of blocks preceding in accordance with coding order 38 are available in already reconstructed form in encoder and decoder at the time of predictively encoding/decoding block 10.

The selector 32 selects, out of a search area 16 of picture 12, a set 40 of one or more patches which match a template area 14 which is adjacent to current block 10. As already described above, the template area may cover pixels to the top of, and the left of, current block 10. In the embodiments described above, the template area 14 has been a two-pixels-wide L-shaped region bordering the top and left-hand edge of block 10. It should be noted, however, that region 14 may also have some other shape, that region 14 may be of another width and that region 14 may have another spatial relationship with respect to block 10.

The predictive encoder 34 is configured to encode predictively block 10 into data stream 36 based on the set 40 of one or more patches. To be more precise, predictive encoder 34 construes a predictor 42 on the basis of set 40 and uses this predictor 42 as a prediction of block 10. A residual encoder 44 of predictive encoder 34 encodes the prediction residual into data stream 36. Residual encoder 44 may be a transform-based residual encoder 44 which, for instance, spectrally decomposes the prediction residual. Further, residual encoder 44 may use entropy coding so as to losslessly encode the quantized residual signal into data stream 36.

As illustrated in FIG. 10, the search area 16 is spatially subdivided into a plurality of subareas 18. In FIG. 10, the number S of these subareas 18 has illustratively been chosen to be 6 whereas the number has been 5 in the embodiments of FIGS. 1 to 3, but it should be noted that the number S may be any number greater than 1. Importantly, apparatus 30 is configured to signal within data stream 36 as to which subarea 18 the set 40 of one or more patches is located in or belongs to. This information 46, thus, indicates one of the S subareas or regions 18 and may be coded into data stream 36 by encoder 30, for instance, predictively, such as, for instance, using spatial prediction relative to the same information 46 with respect to any other block of picture 12 preceding an order 38, and/or using entropy coding such as, for instance, context-adaptive entropy coding.

Thus, in accordance with a coding mode just described, encoder 30 encodes into data stream 36 for block 10 the prediction residual 48 for block 10 as well as information 46.

Figure 11:
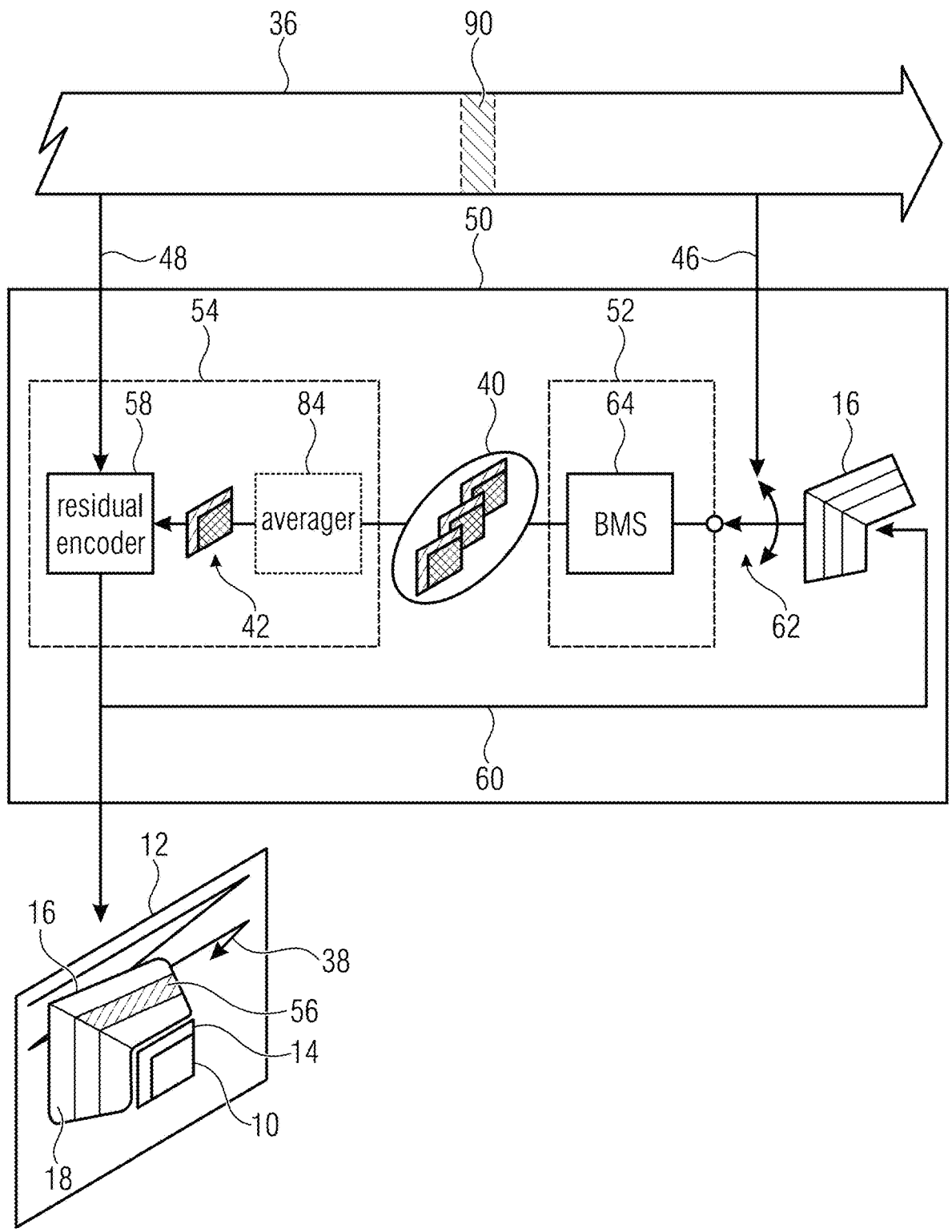
FIG. 11 shows a block diagram of a decoder according to an embodiment of the present application fitting to the encoder of FIG. 10.

Before proceeding with the description of the encoder of FIG. 10, reference is made to FIG. 11 which shows a decoder, or apparatus for picture decoding, fitting to the encoder of FIG. 10. The apparatus of FIG. 11 is generally indicated using reference sign 50 and comprises a selector 52 and a predictive decoder 54. Generally, apparatus 50 of FIG. 11 is configured to decode picture 12 from data stream 36. As described with respect to FIG. 10, decoder 50 of FIG. 11 may be a block-based decoder. That is, decoder 50 may decode picture 12 from data stream 36 in units of blocks to which block 10 belongs, and may either decode each of these blocks using the mode presented hereinafter, or may select for each block of picture 12 one mode out of a set of modes which includes the just-outlined mode in addition to, for instance, one or more intra picture prediction modes and/or one or more intra picture prediction modes. As described with respect to FIG. 10, decoder 50 may obey some coding order defined among the blocks into which picture 12 is subdivided, in decoding the blocks of picture 12 from data stream 36.

Selector 52 selects, out of a search area 56 of picture 12, set 40 of one or more patches which match the template area 14 of current block 10. Predictive decoder 54 predictively decodes current block 10 from data stream 36 based on the set 40 of one or more patches, namely, by forming a prediction signal 42 based on the latter and correcting this prediction signal 42 using the residual signal 48 which a residual decoder 58 of predictive decoder 54 decodes from data stream 36. Predictive decoder 54, thus, derives a reconstruction or reconstructed signal 60 for current block 10 which may then be contained in a search area 56 used with respect to any other block of picture 12 following encoding order 38.

Interestingly, the search areas 16 and 56, within which encoder of FIG. 10 and decoder of FIG. 11 perform the template matching for current block 10, differ. The encoder 30 of FIG. 10 performs the template matching, or the selection, respectively, by selector 32 within all subareas or regions 18 the overall search area 16 is composed of. As illustrated in FIG. 11, however, compared thereto, decoder 50 selects its search area 56 out of the plurality of subareas 18 the overall search area 16 associated with block 10 is subdivided into, with performing the selection which is illustrated in FIG. 11 at 62, depending on signalization 46. As set out above, with respect to FIGS. 1 to 9, this concept of providing decoder 50 with a hint 46 as to which subarea 18 of the encoder-sided search area 16 the template matching within selector 52 of decoder 50 should be restricted to, enables a considerable reduction in computational complexity on the side of the decoder, with merely minor penalties in coding efficiency associated with the usage of template matching.

As already described above with respect to the encoder, entropy coding might be used in order to code the prediction residual 48 for block 10 into data stream 36; accordingly, residual decoder 58 may use entropy decoding in order to obtain the prediction residual 48 from data stream 36. Additionally, and/or alternatively, the residual signal 48 may be conveyed within a data stream in a transform domain such as in the form of a spectral decomposition, and residual decoder 58 may be configured to re-transform the residual signal into a spatial domain using, for instance, the inverse of the spectral decomposition used at the encoder-side.

Figure 12:
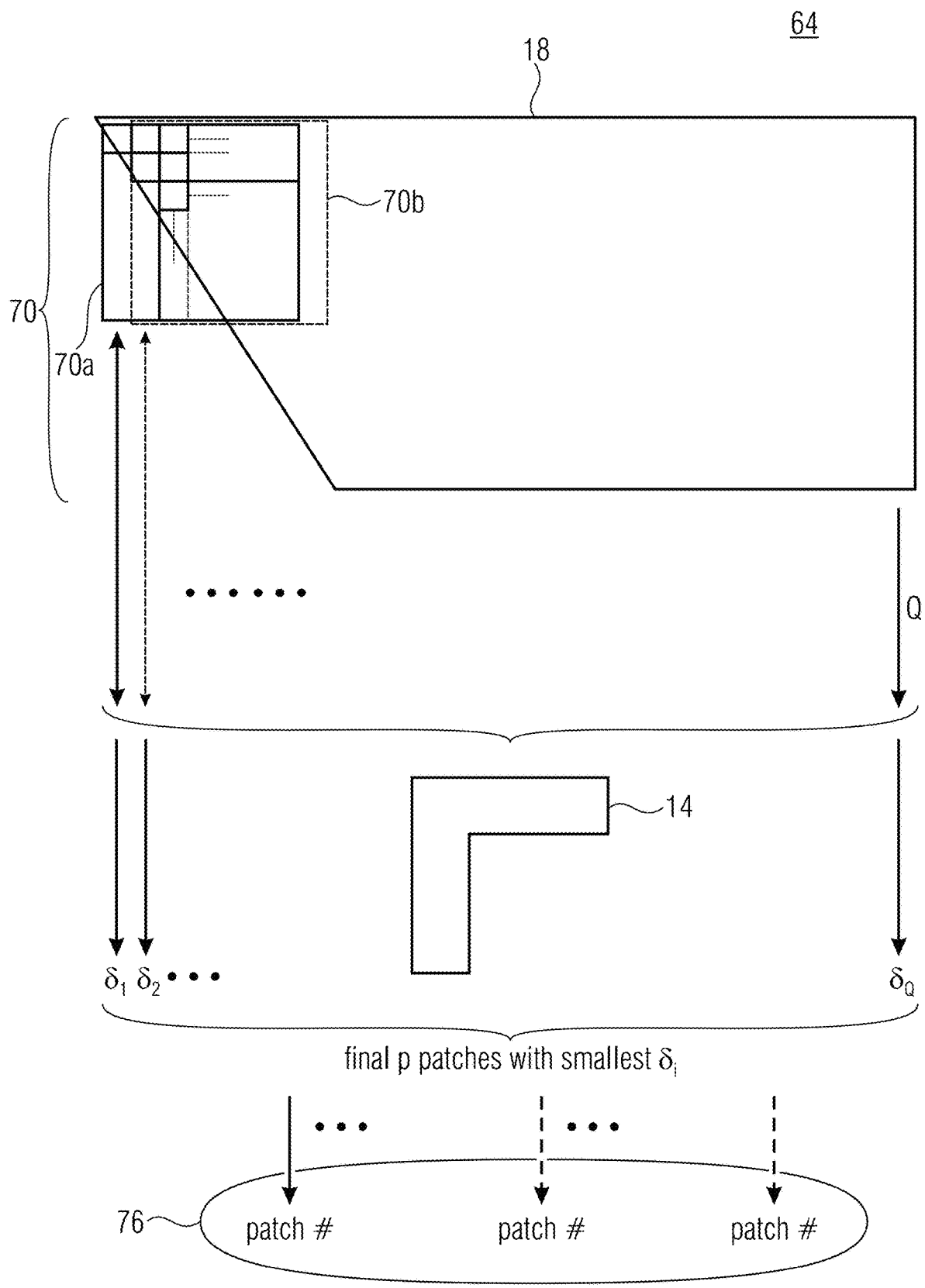
FIG. 12 shows a schematic diagram illustrating a search for a set of one or more patches as it might be performed at encoder and decoder according to an embodiment.

After having described rather generally encoder 30 of FIG. 10 and decoder 50 of FIG. 11, a more specific description is outlined below. As illustrated in FIG. 10, selector 32 performs, for each region 18, a best match search or template matching 64, while selector 52 of decoder 50 performs such best match search or template matching 64 merely with respect to the selected region which forms the decoder-side search area 56. FIG. 12 illustrates how this best match search may look like.

The input for this process is the set 70 of patches within the respective search area for which the best match search 64 is performed. Again, selector 32 of encoder 30, performs such a best match search 64 for each region 18 area 16 is composed of, while selector 52 of decoder 50, performs process 64 merely for the signaled region 18 which, thus, forms the decoder-side search area 56. Set 70 may, for instance, include all patches which may be inscribed into region 18. A patch may be deemed to be inscribable into region 18 if, for instance, more than half of its pixels lie within region 18, or, alternatively, as long as the upper left pixel of the respective patch or the middle or center pixel thereof lies within region 18, additionally needing, for instance, that all pixels within each patch of set 70 have already been reconstructed. Depending on the size of region 18, set 70 may, thus, include a high number of patches, wherein FIG. 12 illustratively shows merely two patches 70a and 70b of set 70. It should be noted that set 70 of patches may not include all possible patches inscribable into, or belonging to, region 18. For instance, patches of set 70 may offset relative to each other by a mutual pitch equal to one pixel, or by a mutual pitch which is longer than one pixel. Each patch 70a and 70b of set 70 is composed of two portions so that the respective patch is congruent to the combination of template 14 and block 10: each patch 70a and 70b comprises a template counterpart area denoted 72 in FIG. 2 and being congruent to template 14, and a portion 74 which is congruent to block 10 and is located relative to template counterpart area such as the template area 14 located relative to block 10.

Let's say, the number of patches 70a and 70b thus forming set 70 would be Q. Process 64 would then determine for each of these Q patches 70a and 70b a deviation $\delta_1 \ldots \delta_Q$. For instance, as denoted above, the sum of square differences (SSD) could be used to this end. That is, $\delta_1$ could be determined for each patch i of set 70 by overlaying the template counterpart area 72 of patch i with the template area 14 and summing up the squares of differences between co-located pixels within these areas 72 and 14, respectively. Naturally, another matching criterion could be used instead of the SSD. Broadly speaking, a similarity measure, such as the inverse of $\delta_1 \ldots \delta_Q$, or a dissimilarity measure, such as $\delta_1 \ldots \delta_Q$, is determined for each patch of set 70 which measures the similarity/dissimilarity of its respective template counterpart area 72 to template area 14. These measures $\delta_1 \ldots \delta_Q$ or the inverse thereof, are then used as a matching criterion in order to select p patches among set 70; namely, those, which are most similar to template 14 in terms of the similarity/dissimilarity measure, i.e. those patches of set 70, for which the deviation measure is smallest or similarity measure is highest.

It should be noted that p had been chosen to be 3 in the examples provided above with respect to FIGS. 1 to 9 and is illustrated to be 3 in FIGS. 10 and 11, but in accordance with alternative embodiments of FIGS. 10 and 11, the number p may be any other number greater than 1 with this being true for FIGS. 1 to 9 also. With respective to the embodiments of FIGS. 10 and 11, it is even true that p might be 1, in which case the subsequently mentioned averager might be left off.

It should be noted that normal averaging is only one of the many ways of predicting the final samples. Weighted averaging as in eq.(2) can also be applied. For p=3, $$\text{Final}=(\alpha \times p1 + \beta \times p2 + \gamma \times p3)/(\alpha+\beta+\gamma) \qquad (2)$$

where $\alpha$, $\beta$, $\gamma$ are the weights and p1, p2, p3 are predictor 1, predictor 2 and predictor 3 respectively, and FINAL is the final predictor.

Experimental results indicate that screen content or screen content like sequences has the best results when p=1. This can possibly be due to the reason that the effect of smoothing from averaging deteriorates the sharpness in such sequences.

In order to effectively model this behavior, without doing much computations, the final prediction can be modified as following: For p=3, Let Err1, Err2 and Err3 be the SSD errors associated with predictor 1, predictor 2 and predictor 3 respectively. Let Thres be the threshold SSD error whose value depends on Err1 with, for instance, Err1<Err2 and Err1<Err3, i.e Err1 being the minimum SSD value.

If (Err2≤Thres and Err3≤Thres)

Final=$(\alpha \times p1+\beta \times p2+\gamma \times p3)/(\alpha+\beta+\gamma)$ else If (Err2≤Thres)

Final=$(\alpha \times p1+\beta \times p2)/(\alpha+\beta)$, discards $p3$ else

Final=$p1$, discards $p2$ and $p3$     (3)

Thus, the choice of number of predictors for the final prediction of the samples depends on the error value associated with the first predictor. For example, Thres may be set to be $\alpha \cdot Err1$ with, for example, $\alpha$ being between 1.1 and 2 inclusively. The above example may easily transferred onto a number of patch predictors greater than 3, or merely two.

Summarizing the most recent note, averaging might be extended in a way so that the above mentioned averaging of patch predictors in set 40 may include a first step of excluding those members of set 40 whose match with the template area 14 is more than a predetermined threshold worser than the best matching candidate/member of set 40 and then skipping any averaging in case of merely the best matching member remaining in set 40 and using the latter instead, or restricting the averaging to the remaining subset of members whose match was good enough, or similar enough to the one of the best matching member, wherein, as mentioned above, thresholding with a threshold which is a predetermined multiple of the best matching candidate's difference measure may be used for exclusion or sorting out.

With this, the outcome of best match search process 64, FIG. 12, is a set of one or more (namely p) patches from which set 76 forms a candidate set 78 of patches for the respective region for which the respective best match search 64 has been performed, or forms the final set 40 of patches directly, such as in the case of decoder where, as explained above, the template matching process 64 is merely performed with respect to the signaled region 56.

Accordingly, the selector 32 of encoder 30, additionally comprises a region selector 80 which selects one of the S candidate sets 78. To this end, region selector 80 may already take into account the amount of data needed to convey information 48 and 46 associated with each of candidate sets 78, thus including the amount of bits associated with coding information 46, or region selector 80 may simply select the candidate set 78, the average of which with respect to portion 74 results on the lowest deviation from block 10 or the like.

Summarizing, region selector 80 of selector 32 selects one out of candidate sets 78 and, accordingly, one of regions 18 of search area 16, and signals the selected one of region 18 by way of information 46 within data stream 36. This signaled region 18, then forms the search area 56 for decoder 50.

With respect to FIG. 12, it is noted that "match" between the individual patches of set 70 on the one hand and template 14 on the other hand, may be determined in a manner other than using SSD or the like. Further, patches of set 70 and, accordingly, of set 40 finally selected by selectors 32 and 52, need not be congruent to the composition of template 14 and block 10. For example, the patches could be of the same size and congruent to block 10 only, with the matching criterion indicating a best match for those patches for which the transition from template 14 towards the respective patch in case of replacing block 10 by the respective patch, would be smoothest.

In case of the number of patches in sets 78 and 40, respectively, i.e., p>1, the prediction encoder 34 of encoder 30 and the predictive decoder 54 of decoder 50 would comprise the optional averagers 82 and 84, respectively, shown with dashed lines in FIGS. 10 and 11 which would average portions 74 of the patches within set 40 so as to result in predictor 42. In case of p=1, the averaging modules 82, 84 would be left off and the only patch within set 40 would form predictor 42. The averaging process performed by modules 82, 84 would, for instance, be a pixel-wise averaging, such as using mean or median, of co-located pixels in case of overlaying the one or more patches of set 40, or, to be more precise, the portion 74. The predictor 42 would thus be a block of pixels of the same size as block 10 and could form the predictor on the basis of which the residual encoding/decoding is performed. It is noted that the above description of FIG. 7 revealed that the restriction with respect to predictor preciseness of predictor 42, that comes along with restricting the template matching process 64 within decoder 50 to one of the subareas 18 within the overall search area 16, is less significant than the reduction in computation complexity achieved by this measure at the decoding side owing to the restriction of the amount of template matching tests Q to be performed; namely, towards merely ones for the signaled region rather than for all regions.

Figure 2:
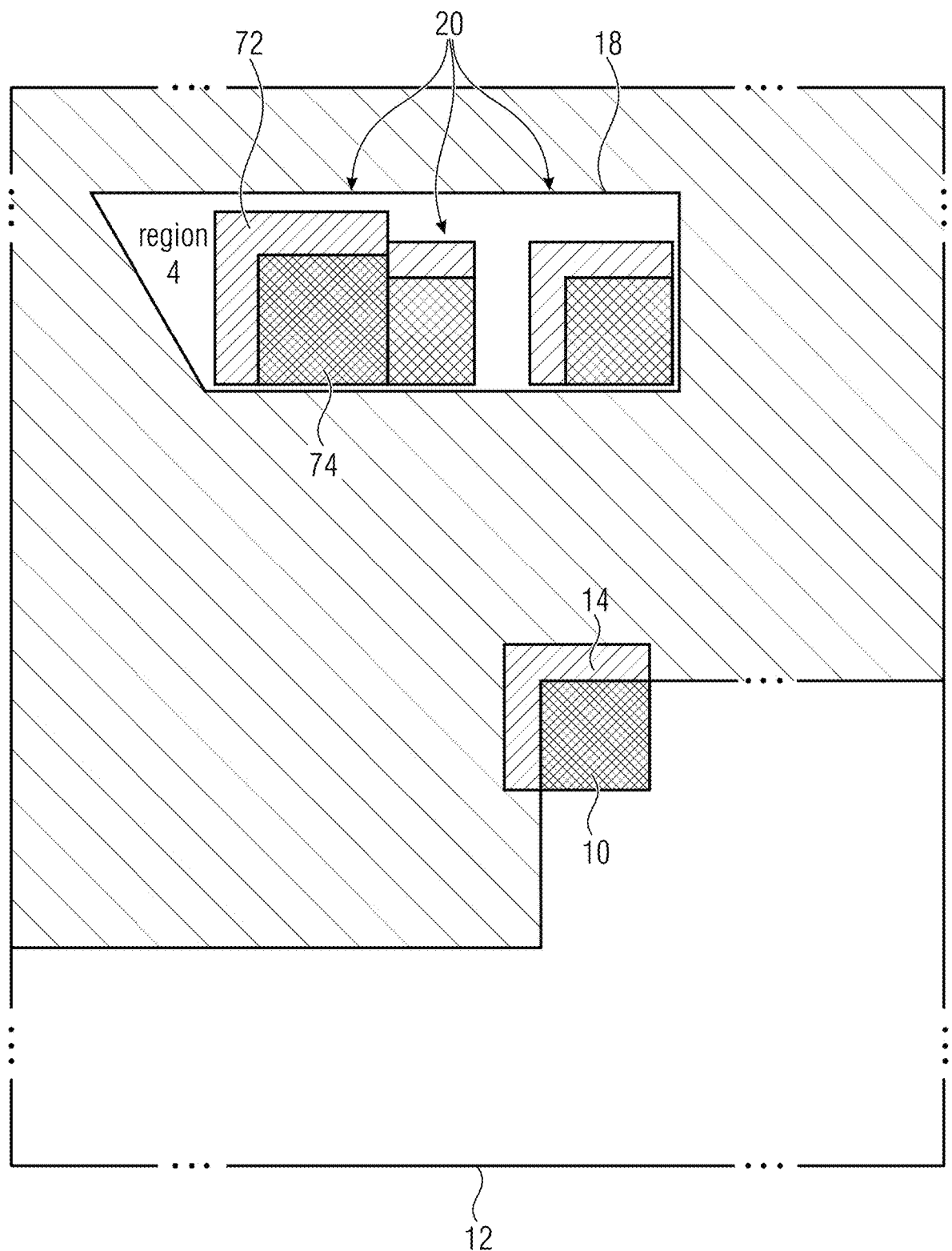
FIG. 2 shows a schematic diagram illustrating a search area composed of five regions to be used in template matching prediction in accordance with an embodiment.
Figure 3:
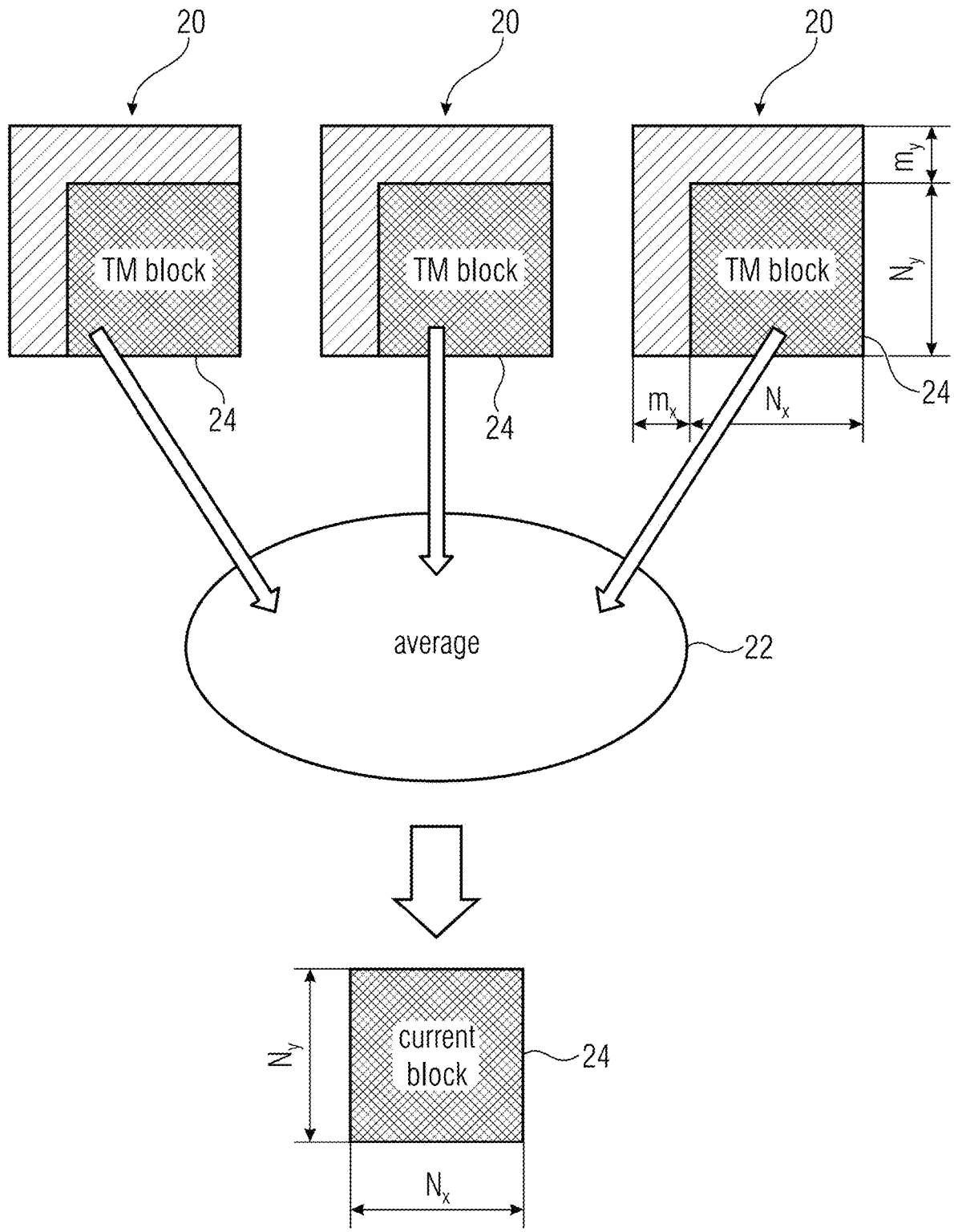
FIG. 3 shows a schematic diagram illustrating a search area composed averaging which may be used in template matching prediction in accordance with an embodiment.

It is also noted that a closer inspection of the inspection of the results shown in FIG. 7 revealed that it is advantageous if the search area 16 is subdivided into the plurality of subareas 18 such that a first subset of the plurality of subareas are horizontally longitudinal areas neighboring each other vertically, while a second subset of the plurality of subareas are vertically longitudinal areas neighboring each other horizontally. In the case of FIGS. 1 to 3, for instance, such a first subset of subareas has been formed by regions 2 and 4, and a second subset of subareas has been formed by regions 3 and 5. In the case of FIG. 10, horizontally longitudinal areas are regions 4, 5 and 6, while the vertically longitudinal areas are regions 1, 2 and 3. Taking into account the fact that in case of using an exemplary coding order as shown in the above figures with respect to 38, already reconstructed/already encoded samples generally lie at the top of, and to the left of, current block 10, it might be advantageous if the first subset of subareas and the second subset of subareas, i.e., the horizontal and vertical ones, mutually extend away from each other with the left-hand side of the horizontal regions and the upper side of the vertical regions being nearest to each other.

In accordance with an embodiment of the present application, signalization 46 signals the subarea 56 which the set 40 of one or more patches is located in, in the form of an index which signalizes this subarea 56 in a manner where this index points to a one-dimensional list of the subareas 18. That is, information 46 does not point to any of regions 18 of search area 16 two-dimensionally such as in form of a two-dimensional vector having two components, but rather indexes one of these regions 18 using a scalar the value of which is mapped onto an ordinary scale of addresses associated with the regions 18. For instance, each region 18 of search area 16, has an integer value associated therewith, with the integer values of the regions 18 being mutually different and forming an immediately consecutive series of numbers starting, for instance with 0 or 1 or any other value.

It should be noted with respect to the embodiment just described with respect to FIGS. 10 to 12, that the overall search area 16 could be chosen to not vary depending on the size of picture 12. In other words, it could be that the size of area 16 could, for blocks of pictures having identical position with respect to, for instance, the upper left corner of the respective picture, the same size irrespective of the size of picture 12. In other words, while encoder and decoder would be able to cope with pictures 12 of different size, the search area 16 could be chosen to be of the same size irrespective of the size of picture 12 which block 10 is part of. Furthermore, in accordance with the embodiments described with respect to FIGS. 10 and 11, the search area 16 represented a window of a certain size, positioned at a predetermined relative spatial location with respect to current block 10 so that for all blocks for which the predictor 42 is determined in the manner described with respect to FIGS. 10 and 11, and for which the window forming search area 16 does not extend beyond the borders of picture 12, the search area 16 is of the same shape and size. The predetermined relative spatial location meant, for instance, that the window 16 is separated from block 10 by template area 14 which adjoins block 10, and extends away from block 10 starting at template area 14. Other possible predetermined spatial relationships would be feasible as well such as the window 16 being distanced from the boarder of block 10 by some predefined distance which might be possibly different from the template area width. However, the size of window 16 may also be set in a manner not independent from the location of block 10 within the picture (provided window 16 fits completely into picture 12). In accordance with alternative embodiments, for instance, the search area 16 is defined to be formed by the complete area of already reconstructed pixels of the current picture 12 relative to current block 10 illustrated by cross-hatching, for instance, in FIG. 1. Alternatively, search area 16 may cover an area extending until the upper edge of picture 12, and until the left-hand side of picture 12 but not extending beyond the right-hand side of block 10. In the latter cases, the number of regions 18 of the search area 16 may be chosen to be constant or independent from, or chosen to vary with the size of the search area 16 which, in turn, depends on the location of block 10 within picture 12. For instance, in the former case, the size of regions 18 may increase with increasing size of area 16 while the number S of regions 16 remains constant, and in the latter case, the number S of regions 18 may increase with increasing size of area 16 while the size of regions 18 remains constant. The latter circumstance of not using a fixed-window-size area 16 as the search area at the encoder-side would increase the computational complexity of the encoder-side but might still lead to moderate computational complexity at the decoder-side owing to the signalization of the subarea 18 to be used as search area 56 at the decoder-side.

The latter circumstance that the size of search area 16 may, provided that the search area 16 does not extend across borders of picture 12, be set by encoder 30 and decoder 50 dependent on certain characteristics of picture 12, is used in accordance with the embodiment described later on with respect to FIGS. 13 and 14, and is merely optional with respect to the embodiment of FIGS. 11 and 12. This optional circumstance is depicted in FIGS. 10 and 11 by way of reference sign 90 which indicates optionally present side information within data stream 36 dependent on which the size of search area 16 may be set. This side information 90 may comprise one or more of the group consisting of a picture size parameter indicating a picture size of picture 12, i.e., the size of the picture to which block 10 belongs, a tile-subdivision information indicating a number of independently coded picture tiles of the picture 12 to which block 10 belongs, and a picture content/identifier which semantically distinguishes between different types of scene content in the picture to which the respective block 10 belongs. This side information 90 may have a greater scope and may be valid, for instance, for a picture sequence of a video which the predetermined picture block 10 is part of. For instance, the side information 90 may be conveyed within a VPS or SPS, for instance.

In case of area 16 being a window spatially positioned relative to block 10, which is of predetermined size—dependent on, or independent from side information 90—it is noted that special measures may be taken at encoder and/or decoder if window 16 extends beyond borders of picture 12. Obviously, encoder 30 may not perform template matching for regions 18 lying outside picture 12, at least for those, completely lying outside picture 12. They are not available. Encoder 30 may, however, additionally skip template matching for those regions 18, partially extending outside picture 12. They might be interpreted as not being available, too. For the decoder 50, this restriction might be of no interest, as it is informed on the chosen region 18 via signalization 46 and performs the template matching within this region 18 only. The decoder 50 may, however, determine which region 18 the encoder 18 has subject to template matching and which not, in the same manner, namely by determining which region 18 is outside picture 12 or extends beyond the picture borders, and accordingly, is aware of the set of regions 18 which the signalization 46 may possibly appoint the decoder's search area 56 for block 10. This set of available regions 18 might be reduced compared to the complete set of regions 18 of a template 16 completely residing within the picture area. This circumstance might been seen as a reduction of a size of the area 16 for which template matching is performed within the encoder. For blocks 10 sufficiently distanced from the picture borders, especially the upper and left border, the window 16 would be of the same size within the respective picture, or differently speaking, for all picture positions sufficiently distanced from picture borders, blocks 10 positioned at such positions have a template 16 of the same size associated therewith. The circumstance of a reduced set of "signalable" regions 18 might be exploited for reducing the signaling overhead associated with signalization 46. That is, the manner at which signalization 46 is coded into, and decoded from data stream 46, may be dependent on the reduction of the "available" set of regions 18 relative to the complete set of regions so that the smaller this reduced set is, the smaller the number of bits is which is consumed in the data stream 36 for signalization 46. The value set of signalization 46 may be reduced accordingly, or the context for entropy coding/decoding signalization 46 may be adapted to the size of the "available" region set. Even alternatively, or additionally, as soon as the number of the reduced set of available regions 18 is smaller than a predetermined number, then the described template matching mode might be disallowed for block 10 at all with a remaining set of coding modes such as other intra picture prediction modes or inter picture prediction modes being available for block 10 instead. As done in case of signalization 46, changes might be done in coding/ decoding a signalization in data stream 36 which, in accordance with an embodiment, is present in data stream for blocks such as block 10 so as to signal its coding mode. For example, the cardinality of a set of signalable modes for block 10 might be chosen independent from the number of available regions 18, with the template matching mode being part of this set or not depending on the number of available regions 18. Alternatively, a set of signalable modes for block 10 might include or not include the template matching mode depending on the number of available regions 18 with the cardinality of the set varying accordingly, i.e. being increased by one in case of the number of available regions 18 not being smaller than the predetermined number, than compared to the case of the number of available regions 18 being smaller than the predetermined number.

In the same manner as just-outlined, situations may be handled, at which the search area 16—might it be a template of predetermined size, positioned spatially relative to block 10, or might it be an area consuming all or, or a part of the already decoded/encoded area traversed prior to block 10—extends beyond borders of a slice which the current block 10 is located in, or beyond borders of a tile which the current block 10 is located in. Slices and tiles are portions of a picture into which the picture 12 may be divided and which are defined as independently decodable portions so that coding inter-dependencies are disallowed.

Figure 13:
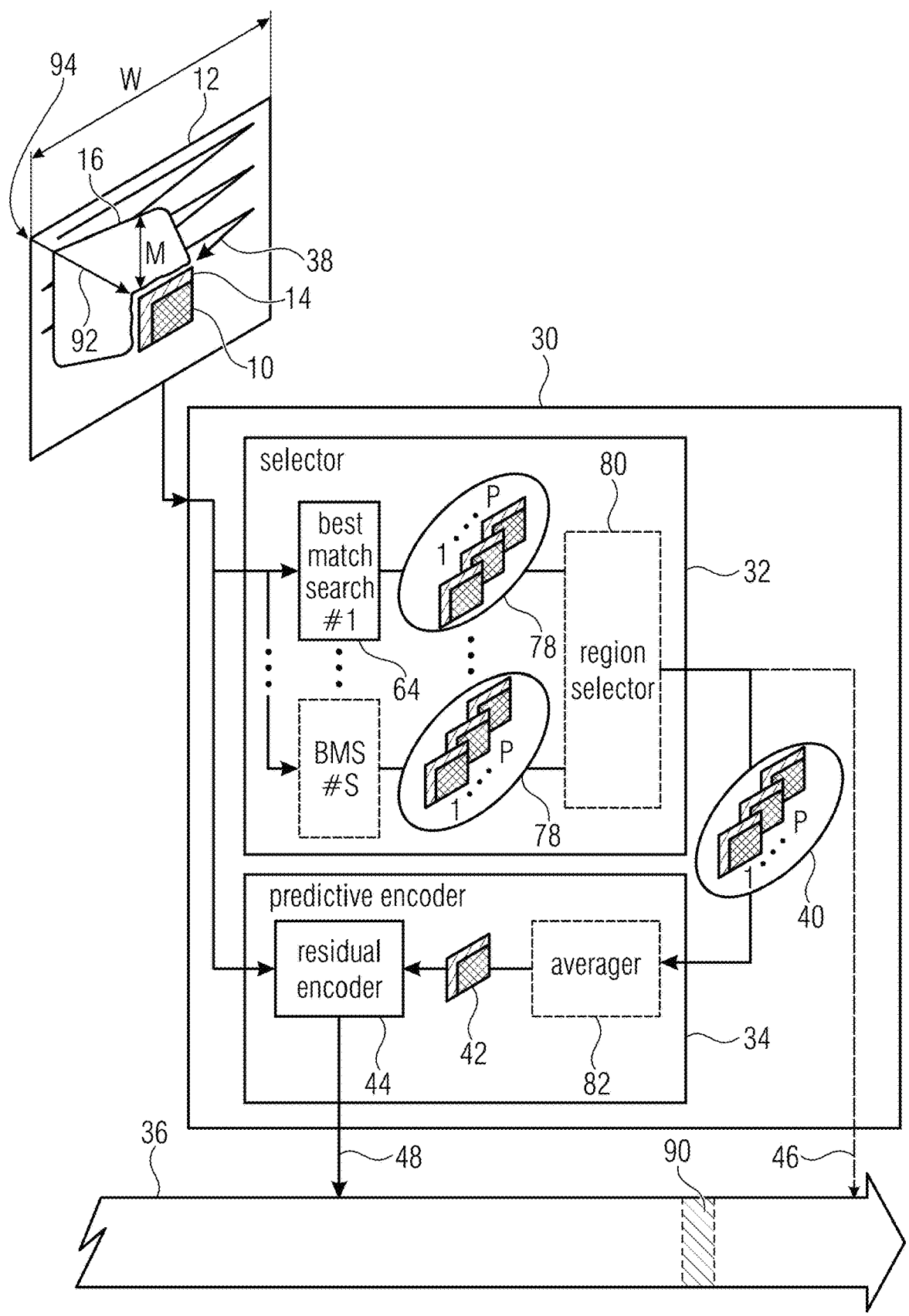
FIG. 13 shows a block diagram of an encoder according to an embodiment of the present application using a search area the size of which is set according to side information in the data stream.
Figure 14:
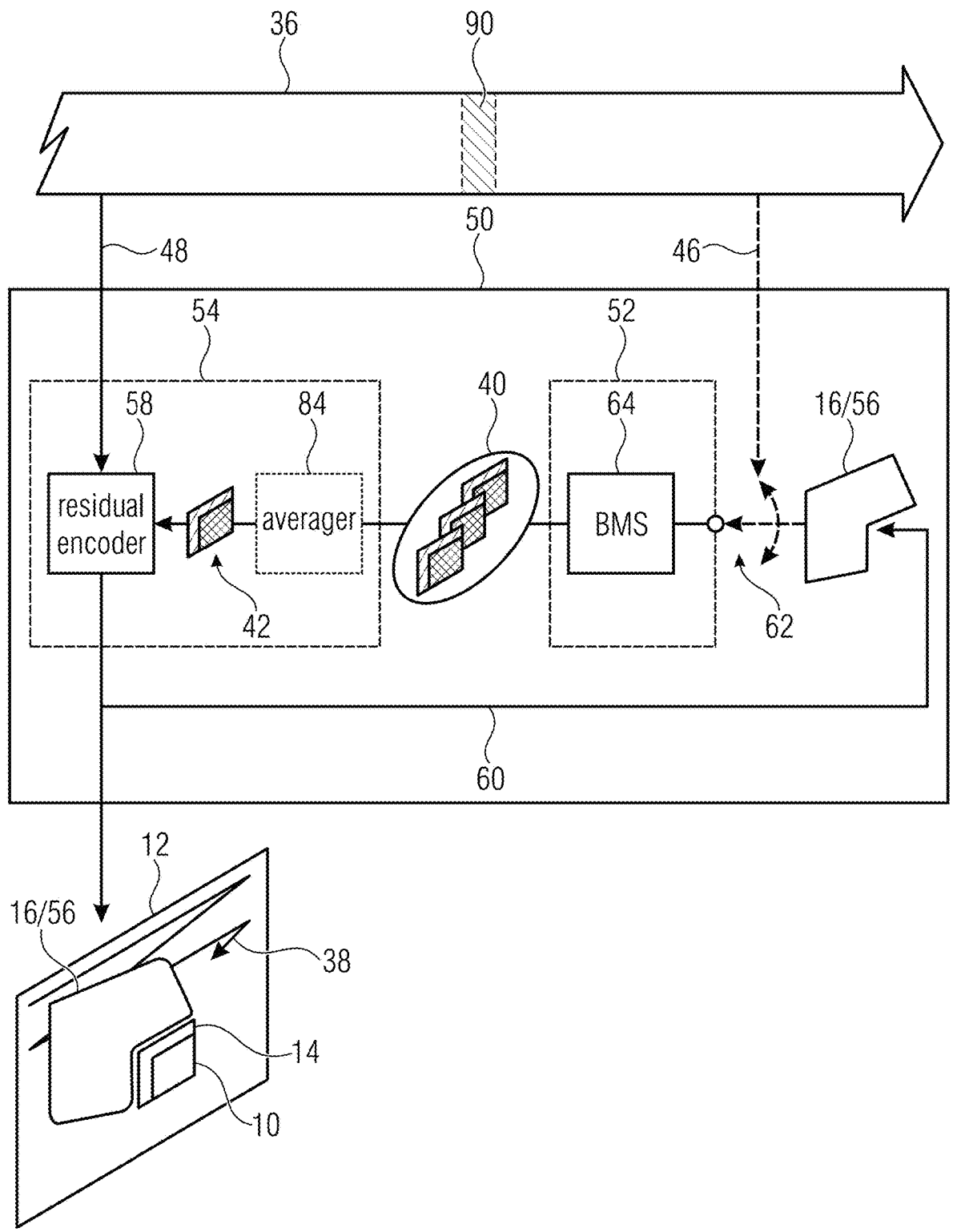
FIG. 14 shows a block diagram of a decoder according to an embodiment of the present application fitting to the encoder of FIG. 13.

FIGS. 13 and 14 show an encoder 30 and a decoder 50 in accordance with further embodiments of the present application. Encoder 30 and decoder 50 of FIGS. 13 and 14 fit to each other. The functionality of encoder and decoder of these figures have already been described above with respect to FIGS. 10 and 12, to the description of which, insofar, reference is made. However, in accordance with the embodiments of FIGS. 13 and 14, search area 16 may not be subdivided spatially into regions 18, i.e., S of FIG. 10 may be equal to 1, and accordingly, information 46 may not be transmitted in data stream 36 and furthermore, the search area used in encoder and decoder might be the same in accordance with the embodiment of FIGS. 13 and 14. The encoder 30 and decoder 50 of FIGS. 13 and 14 are, however, configured to set the size of search area 16, denoted as M in FIGS. 13 and 14 for ease of associating these embodiments with the description of FIGS. 1 to 9, depending on the side information 90 in data stream 36. Insofar, the description brought forward above with respect to FIGS. 10 to 12 is referred to and shall form also a description of FIGS. 13 and 14. Owing to the fact that S may be 1 in accordance with FIGS. 13 and 14, the region selector 80 might be missing in selector 32 and the averagers 82 and 84 might be missing in the encoder and decoder, respectively. The best match search 64 might be performed within selector 32 merely once; namely, with respect to search area 16 which also forms the search area 56 of the decoder. If, however, S>1, then the description brought forward above with respect to FIGS. 10 to 12 applies.

In other words, in accordance with FIGS. 13 and 14, the search area 16 and, optionally 56, would be chosen to vary depending on side information 90. This side information 90 may comprise one or more of the group consisting of a picture size parameter indicating a picture size W of picture 12, i.e., the size of the picture to which block 10 belongs, a tile-subdivision information indicating a number of independently coded picture tiles of the picture 12 to which block 10 belongs, and a picture content/identifier which semantically distinguishes between different types of scene content in the picture to which the respective block 10 belongs. This side information 90 may have a greater scope and may be valid, for instance, for a picture sequence of a video which the predetermined picture block 10 is part of. For instance, the side information 90 may be conveyed within a VPS or SPS, for instance. The size of area 16 may, thus, for blocks of pictures 12 having identical position 92 with respect to, for instance, the upper left corner 94 of the respective picture 12, a size M which differs among pictures 12 of different size. In other words, encoder and decoder would be able to cope with pictures 12 of different size, and the search area 16 would be chosen to be of a size M which is set depending on the size M of picture 12 which block 10 is part of. This dependency could be realized only for blocks 10 of a certain size such as for instance, blocks 10 below a certain size threshold. Naturally, the same applies for other picture characteristics using which side information 90 discriminates between different pictures as well and is not restricted to the picture size W which, as illustrated in FIG. 13, may be measured as the picture's width. Within one particular picture 12, the search area 16 could by of the same size M for all blocks 10 for which the predictor 42 is used for predictive coding, and for which the window forming search area 16 does not extend beyond the borders of this picture 12. The window 16 could be positioned with respect to block 10 so that same have a predetermined relative spatial relationship. For instance, window 16 is separated from block 10 by template area 14 which adjoins block 10, and extends away from block 10 starting at template area 14. Other possible predetermined spatial relationships would be feasible as well such as the window 16 being distanced from the boarder of block 10 by some predefined distance which might be possibly different from the template area width.

In a manner similar to the description of FIGS. 10 and 11, the template matching mode for block 10—even when not using subdivision into regions 18 in signalization 46—may, in accordance with an embodiment, be forbidden for block 10 if the area 16/56 extends more than a predetermined amount beyond the border of the picture, slice and/or tile containing block 10, or if the area 16/56 within the border of the picture, slice and/or tile containing block 10 is smaller than a predetermined size.

Figure 15:
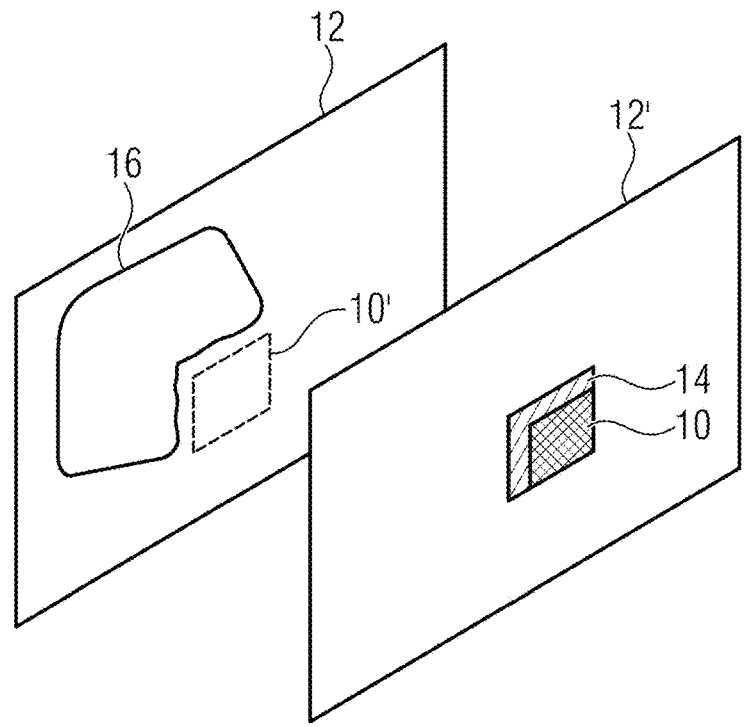
FIG. 15 shows a schematic diagram illustrating a possibility to transfer above intra picture concepts to inter picture prediction.

With respect to FIGS. 10 to 14, it is noted that the above embodiments related to the case where the template area 14 and predetermined picture block or current block 10 are within the same picture 12 with the search area 16 or 56 also being within this picture 12 and spatially neighboring block 10. Insofar, the concepts provided by the embodiments of encoder and decoder of FIGS. 10 to 14 formed examples for an intra picture prediction mode of the respective encoder or decoder. It is, however, possible to modify the description brought forward above with respect to FIGS. 1 to 14 and with respect to 10 and 14, especially, so as to arrive at further embodiments of the present application where the respective concept is used for inter picture prediction. This circumstance is illustrated in FIG. 15. Block 10 and associated template 14 are shown to be part of, or being within, picture 12', i.e., the picture currently encoded/decoded. Another picture 12 is, however, also shown in FIG. 15. In particular, shown by dotted lines, FIG. 15 shows a block 10' of picture 12, which is co-located to current block 10. As illustrated in FIG. 15, the search area 16 mentioned in the aforementioned embodiments, might in fact be a portion of picture 12, i.e., a picture different from the current picture 12'. For instance, picture 12 may be a picture of the same video to which picture 12' belongs, or may be a picture of another view but a picture of, for instance, the same instance as picture 12'. Area 16 may spatially neighbor block 10' and/or overlay block 10'. Thus, using the alternative shown in FIG. 15, all the above-described embodiments may be modified so as to form encoders/decoders supporting a special type of inter picture prediction.

Figure 16:
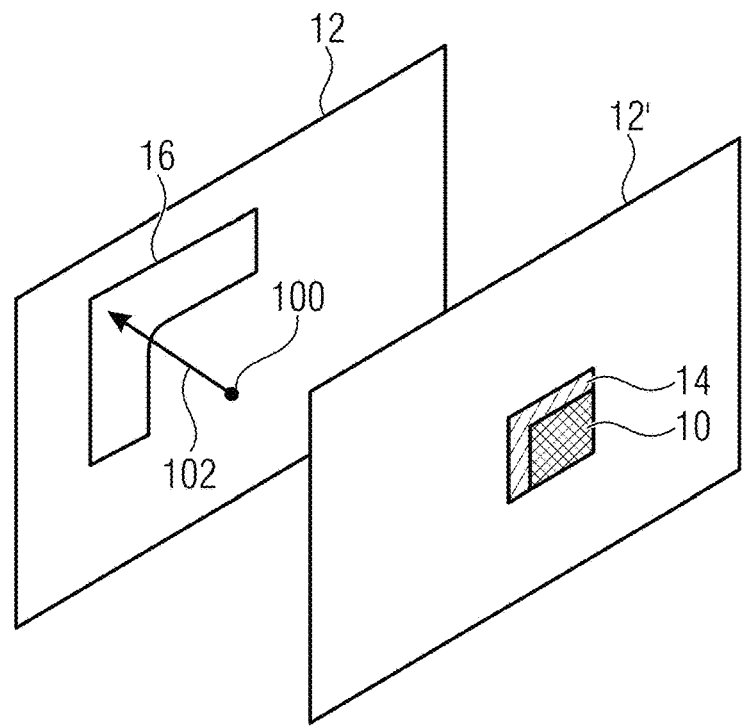
FIG. 16 shows a schematic diagram illustrating another possibility to transfer above intra picture concepts to inter picture prediction using a inter picture vector.

FIG. 16 shows a modification of FIG. 15. Here, area 16 is not chosen to have a certain spatial location relative to co-located block 10' within picture 10'. Rather, the search area 16 is part of picture 12 and is displaced relative to a position 100 within picture 12 which is co-located to block 10 within picture 12' by a vector 102 which is conveyed within the data stream 36, i.e., is derived at the decoder side from the data stream, and is signaled within the data stream by the encoder. Imagine, for instance, that vector 102 is transmitted in data stream 36 more coarsely, then the pitch at which the tested patches of set 70 are mutually distanced within area 16 and 56, respectively. In this case, the template matching 64 would be used to determine a sort of fine tuning of vector 102.

Thus, above embodiments, revealed, inter alias, improved intra prediction techniques. Intra prediction techniques are one of the most important steps in video coding, where spatial redundancy is exploited for coding efficiency. The state-of-the-art H.265/HEVC has 35 intra modes including 33 angular, DC and planar modes. However, these methods are still insufficient, especially when there are complex structures involved. This opens the way for searching for new techniques for intra prediction. Template matching has been proposed previously, but an increase in substantial complexity from the search algorithm tended to make it less attractive for further research. The above concepts provide the ability to form a fast template matching intra mode for H.265/HEVC. The discussed concepts enable to achieve an average BD-rate gain of −1.15% for classes A to E with 133% decoder complexity. In other words, fast template matching intra mods were presented with H.265/HEVC as the possible target reference. The experimental results indicate that the new mode can achieve an average BD-rate gain of −1.15% for classes A to E with 133% decoder complexity. On the basis of this study, an adaptive window for carrying out the searching template match may be adapted. The window size may be adapted to the frame size of the video sequence. Further, a gain to −1.31% with 153% complexity can be achieved by unequal search region sizes. The research underlines the fact that a good prediction from a local search is a much better trade-off than an optimal prediction from a highly time consuming global search. More complexity reduction could be achieved by terminating the search algorithm after reaching a minimum threshold error value.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, one or more of the most important method steps may be executed by such an apparatus.

The inventive data stream can be stored on a digital storage medium or can be transmitted on a transmission medium such as a wireless transmission medium or a wired transmission medium such as the Internet.

Depending on certain implementation requirements, embodiments of the invention can be implemented in hardware or in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitionary.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are performed by any hardware apparatus.

The apparatus described herein may be implemented using a hardware apparatus, or using a computer, or using a combination of a hardware apparatus and a computer.

The apparatus described herein, or any components of the apparatus described herein, may be implemented at least partially in hardware and/or in software.

The methods described herein may be performed using a hardware apparatus, or using a computer, or using a combination of a hardware apparatus and a computer.

The methods described herein, or any components of the apparatus described herein, may be performed at least partially by hardware and/or by software.

While this invention has been described in terms of several advantageous embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

REFERENCES

[1] Vivienne Sze, Madhukar Budagavi, and Gary J. Sullivan, *High Efficiency Video Coding (HEVC) Algorithms and Architectures*, Springer, 2014.

[2] Thiow Keng Tan, Choong Seng Boon, and Yoshinori Suzuki, "Intra prediction by template matching," in *ICIP* 2006, Atlanta, GA, 2006, pp. 1693-1696.

[3] Thiow Keng Tan, Choong Seng Boon, and Yoshinori Suzuki, "Intra prediction by averaged template matching predictors," in *Proc. CCNC* 2007, Las Vegas, NV, USA, 2007, pp. 405-109.

[4] Yi Guo, Ye-Kui Wang, and Houqiang Li, "Priority-based template matching intra prediction," in *IEEE International Conference on Multimedia and Expo* 2008, Hannover, Germany, June 2008, pp. 1117-1120.

[5] Yinfei Zheng, Peng Yin, Oscar Divorra Escoda, Xin Li, and Cristina Gomila, "Intra prediction using template matching with adaptive illumination compensation," in *Proc. IEEE International Conference on Image Processing ICIP*2008, San Diego, CA, October 2008.

[6] Matthieu Moinard, Isabelle Amonou, Pierre Duhamel, and Patrice Brault, "A set of template matching predictors for intra video coding," in *IEEE International Conference on Acoustics, Speech and Signal Processing (ICASSP)* 2010, March 2010.

[7] Safa Cherigui, Christine Guillemot, Dominique Thoreau, Philippe Guillotel, and Patrick Perez, "Hybrid template and block matching algorithm for image intra prediction," in *IEEE International Conference on Acoustics, Speech and Signal Processing (ICASSP)*, Kyoto, March 2012, pp. 781-784.

[8] Tao Zhang, Haoming Chen, Ming-Ting Sun, Debin Zhao, and Wen Gao, "Hybrid angular intra/template matching prediction for HEVC intra coding," in *Visual Communications and Image Processing* 2015, Singapore, December 2015, pp. 1-4.

[9] F. Bossen, "Common test conditions and software reference configurations," in *JCTVC-L1100 of JCT-VC*, Geneva, 2013.

The invention claimed is:

1. Apparatus for picture decoding, configured to select, out of a search area of a picture, a set of one or more patches which match a template area adjacent to a predetermined picture block; and predictively decode the predetermined picture block from a data stream based on the set of one or more patches, wherein the apparatus is configured to select the search area out of a plurality of subareas into which an overall search area associated with the predetermined picture block is sub-divided, based on a signalization in the data stream, wherein the template area and the predetermined picture block are within a further picture and the overall search area is displaced from a position within the picture collocated to the predetermined picture block by a vector, wherein the apparatus is configured to derive the vector from the data stream.

2. Apparatus for picture decoding, configured to select, out of a search area of a picture, a set of one or more patches which match a template area adjacent to a predetermined picture block; and predictively decode the predetermined picture block from a data stream based on the set of one or more patches, wherein the apparatus is configured to select the search area out of a plurality of subareas into which an overall search area associated with the predetermined picture block is sub-divided, based on a signalization in the data stream, wherein the overall search area is subdivided into the plurality of subareas such that a first subset of the plurality of subareas are horizontally longitudinal areas neighboring each other vertically, and a second subset of the plurality of subareas are vertically longitudinal areas neighboring each other horizontally.

3. Apparatus according to claim 2, wherein the apparatus uses a horizontal raster scan coding order running from picture top to picture bottom and the overall search area is subdivided into the plurality of subareas such that the horizontally longitudinal areas and the vertically longitudinal areas extend away from each other from an upper end of the vertically longitudinal areas and a left-hand end of the horizontally longitudinal areas, respectively.

4. Apparatus for picture decoding, configured to select, out of a search area of a picture, a set of one or more patches which match a template area adjacent to a predetermined picture block; and predictively decode the predetermined picture block from a data stream based on the set of one or more patches, and configured to select the search area out of the plurality of subareas into which the overall search area associated with the predetermined picture block is sub-divided, based on the signalization in the data stream by deriving an index from the signalization and applying the index to a one-dimensional list of the plurality of subareas, wherein the apparatus is configured to select the search area out of a plurality of subareas into which an overall search area associated with the predetermined picture block is sub-divided, based on a signalization in the data stream.

5. Apparatus for picture decoding, configured to select, out of a search area of a picture, a set of one or more patches which match a template area adjacent to a predetermined picture block; and predictively decode the predetermined picture block from a data stream based on the set of one or more patches, and configured to set a size of the overall search area and/or the subareas depending on side information in the data stream, wherein the apparatus is configured to select the search area out of a plurality of subareas into which an overall search area associated with the predetermined picture block is sub-divided, based on a signalization in the data stream.

6. Apparatus according to claim 5, wherein the side information comprises one or more of the group comprising
a picture size parameter indicating a picture size;
a tile-subdivision information indicating a number independently coded picture tiles; and
a picture content class identifier.

7. Apparatus according to claim 6, the side information is valid for a picture sequence of a video which the predetermined picture block is part of.

8. Method for picture decoding, comprising
selecting, out of a search area of a picture, a set of one or more patches which match a template area adjacent to a predetermined picture block; and
predictively decoding the predetermined picture block from a data stream based on the set of one or more patches, and
selecting the search area out of a plurality of subareas into which an overall search area associated with the predetermined picture block is sub-divided, based on a signalization in the data stream,
wherein the overall search area is subdivided into the plurality of subareas such that a first subset of the plurality of subareas are horizontally longitudinal areas neighboring each other vertically, and a second subset of the plurality of subareas are vertically longitudinal areas neighboring each other horizontally.

9. Apparatus for picture coding, configured to
select, out of a search area of a picture, a set of one or more patches which match a template area adjacent to a predetermined picture block; and
predictively encode the predetermined picture block into a data stream based on the set of one or more patches,
wherein the search area is spatially subdivided into a plurality of subareas and the apparatus is configured to signal within the data stream which subarea the set of one or more patches are located in,
wherein the template area and the predetermined picture block are within a further picture and the search area is displaced from a position within the picture collocated to the predetermined picture block by a vector,
wherein the apparatus is configured to determine the vector and signal the vector in the data stream.

10. Apparatus for picture coding, configured to
select, out of a search area of a picture, a set of one or more patches which match a template area adjacent to a predetermined picture block; and
predictively encode the predetermined picture block into a data stream based on the set of one or more patches,
wherein the search area is spatially subdivided into a plurality of subareas and the apparatus is configured to signal within the data stream which subarea the set of one or more patches are located in,
wherein the search area is subdivided into the plurality of subareas such that a first subset of the plurality of subareas are horizontally longitudinal areas neighboring each other vertically, and a second subset of the plurality of subareas are vertically longitudinal areas neighboring each other horizontally.

11. Apparatus according to claim 10, wherein the apparatus uses a horizontal raster scan coding order running from picture top to picture bottom and the search area is subdivided into the plurality of subareas such that the horizontally longitudinal areas and the vertically longitudinal areas extend away from each other from an upper end of the vertically longitudinal areas and a left-hand end of the horizontally longitudinal areas, respectively.

12. Apparatus for picture coding, configured to
select, out of a search area of a picture, a set of one or more patches which match a template area adjacent to a predetermined picture block; and
predictively encode the predetermined picture block into a data stream based on the set of one or more patches, and
configured to set a size of the search area and/or a count of the plurality of subareas depending on side information in the data stream,
wherein the search area is spatially subdivided into a plurality of subareas and the apparatus is configured to signal within the data stream which subarea the set of one or more patches are located in.

13. Apparatus according to claim 12, wherein the side information comprises one or more of the group comprising
a picture size parameter indicating a picture size;
a tile-subdivision information indicating a number independently coded picture tiles; and
a picture content class identifier.

14. Apparatus according to claim 13, wherein the side information is valid for a picture sequence of a video which the predetermined picture block is part of.

15. Method for picture coding, comprising
selecting, out of a search area of a picture, a set of one or more patches which match a template area adjacent to a predetermined picture block; and
predictively encoding the predetermined picture block into a data stream based on the set of one or more patches,
wherein the search area is spatially subdivided into a plurality of subareas and the method comprises signaling within the data stream which subarea the set of one or more patches are located in,
wherein the search area is subdivided into the plurality of subareas such that a first subset of the plurality of subareas are horizontally longitudinal areas neighboring each other vertically, and a second subset of the plurality of subareas are vertically longitudinal areas neighboring each other horizontally.

16. Apparatus for picture decoding, configured to
select, out of a search area of a picture, a set of one or more patches which match a template area adjacent to a predetermined picture block; and
predictively decode the predetermined picture block from a data stream based on the set of one or more patches,
wherein the apparatus is configured to set a size of the search area depending on side information in the data stream.

17. Apparatus according to claim 16, wherein the template area and the predetermined picture block are within the picture and the search area spatially neighbors the predetermined picture block.

18. Apparatus according to claim 16, wherein the template area and the predetermined picture block are within a further picture and the search area spatially neighbors or overlays a block of the picture collocated to the predetermined picture block.

19. Apparatus according to claim 16, wherein the template area and the predetermined picture block are within a further picture and the search area is displaced from a position within the picture collocated to the predetermined picture block by a vector, wherein the apparatus is configured to determine the vector and signal the vector in the data stream.

20. Apparatus according to claim 18, wherein the picture and the further picture are video pictures of a video or pictures of different views.

21. Apparatus according to claim 16, wherein a count of the one or more patches is more than one.

22. Apparatus according to claim 16, wherein the side information comprises one or more of the group comprising
a picture size parameter indicating a picture size;
a tile-subdivision information indicating a number independently coded picture tiles; and
a picture content class identifier.

23. Apparatus according to claim 16, the side information is valid for a picture sequence of a video which the predetermined picture block is part of.

24. Method for picture decoding, comprising
selecting, out of a search area of a picture, a set of one or more patches which match a template area adjacent to a predetermined picture block; and
predictively decoding the predetermined picture block from a data stream based on the set of one or more patches, and
setting a size of the search area depending on side information in the data stream.

25. Apparatus for picture coding, configured to
select, out of a search area of a picture, a set of one or more patches which match a template area adjacent to a predetermined picture block; and
predictively encode the predetermined picture block into a data stream based on the set of one or more patches,
wherein the apparatus is configured to set a size of the search area depending on side information in the data stream.

26. Apparatus according to claim 25, wherein the template area and the predetermined picture block are within the picture and the search area spatially neighbors the predetermined picture block.

27. Apparatus according to claim 25, wherein the template area and the predetermined picture block are within a further picture and the search area spatially neighbors a block of the picture co-located to the predetermined picture block.

28. Apparatus according to claim 25, wherein the template area and the predetermined picture block are within a further picture and the search area is displaced from a position within the picture collocated to the predetermined picture block by a vector, wherein the apparatus is configured to determine the vector and signal the vector in the data stream.

29. Apparatus according to claim 27, wherein the picture and the further picture are video pictures of a video or pictures of different views.

30. Apparatus according to claim 25, wherein a count of the one or more patches is more than one.

31. Apparatus according to claim 25, wherein the side information comprises one or more of the group comprising
a picture size parameter indicating a picture size;
a tile-subdivision information indicating a number independently coded picture tiles; and
a picture content class identifier.

32. Apparatus according to claim 25, wherein the side information is valid for a picture sequence of a video which the predetermined picture block is part of.

33. Method for picture coding, comprising
selecting, out of a search area of a picture, a set of one or more patches which match a template area adjacent to a predetermined picture block; and
predictively encoding the predetermined picture block into a data stream based on the set of one or more patches, and
setting a size of the search area depending on side information in the data stream.

34. A non-transitory digital storage medium having a computer program stored thereon to perform the method for picture decoding, the method comprising
selecting, out of a search area of a picture, a set of one or more patches which match a template area adjacent to a predetermined picture block; and
predictively decoding the predetermined picture block from a data stream based on the set of one or more patches, and
setting a size of the search area depending on side information in the data stream,
when said computer program is run by a computer.

35. A non-transitory digital storage medium having a computer program stored thereon to perform the method for picture coding, the method comprising
selecting, out of a search area of a picture, a set of one or more patches which match a template area adjacent to a predetermined picture block; and
predictively encoding the predetermined picture block into a data stream based on the set of one or more patches, and
setting a size of the search area depending on side information in the data stream,
when said computer program is run by a computer.

* * * * *